April 1, 1941.    H. E. KÄMMEL    2,236,642
TYPEWRITING-CALCULATING MACHINE
Filed May 14, 1934    16 Sheets-Sheet 10

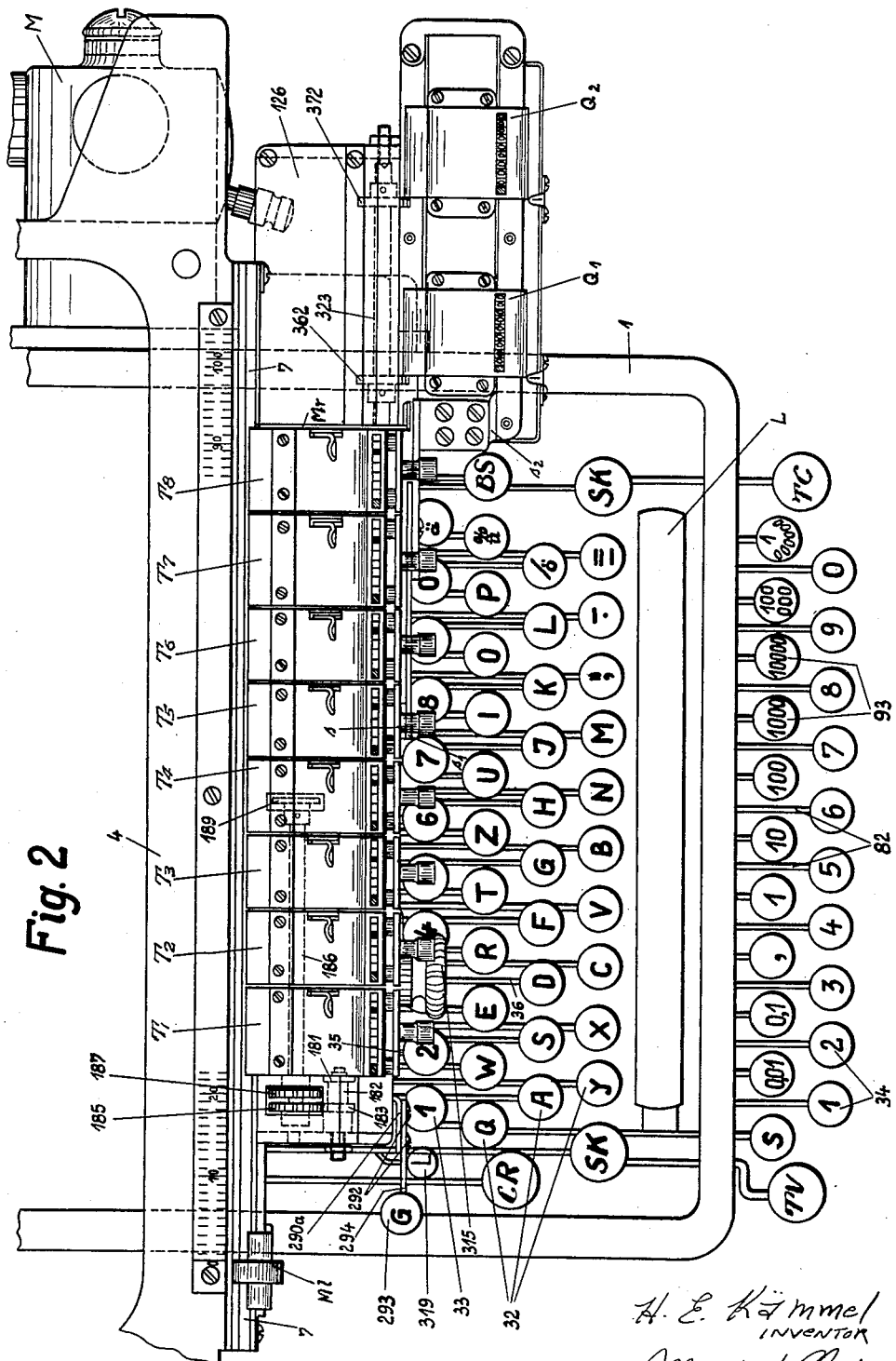

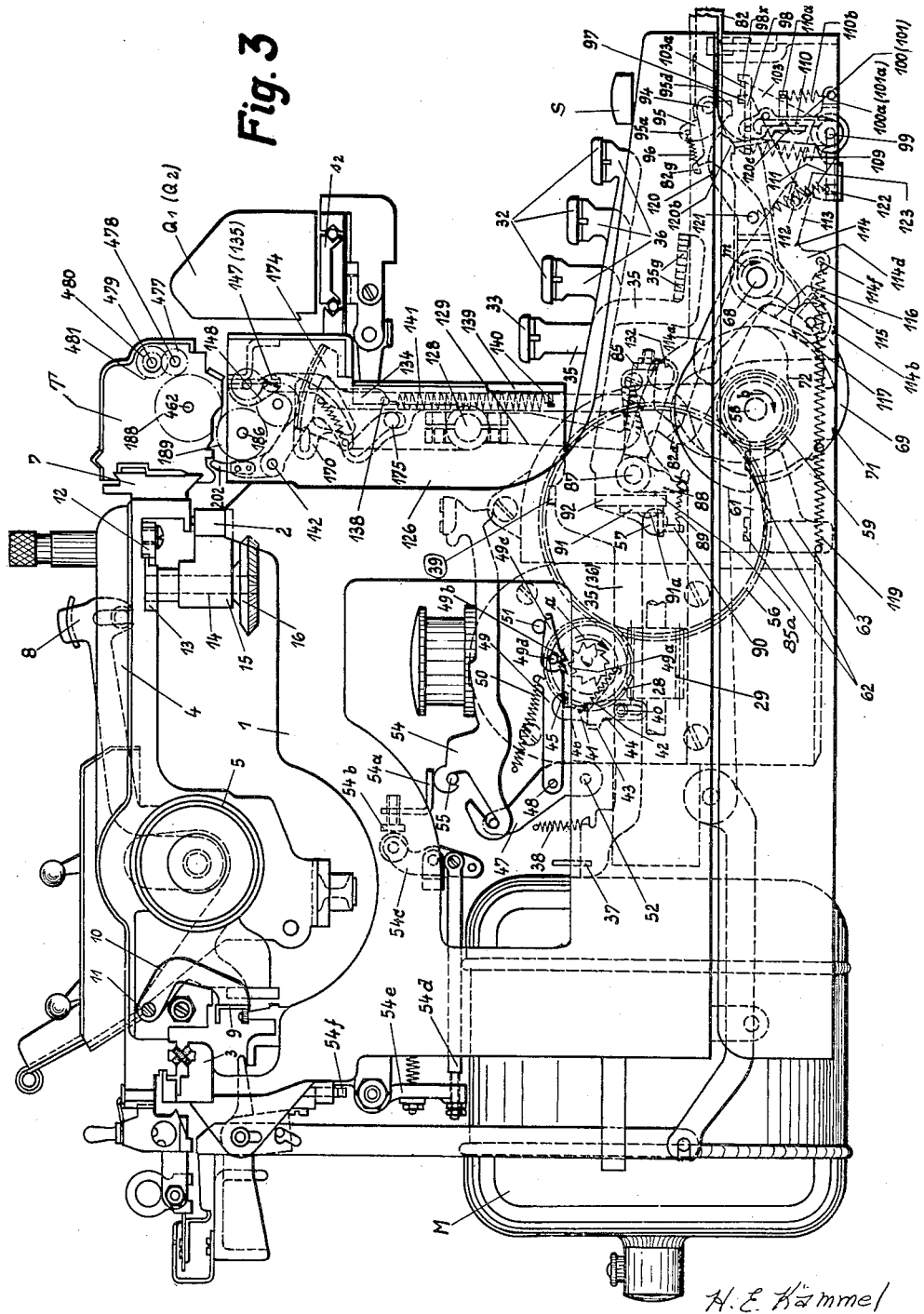

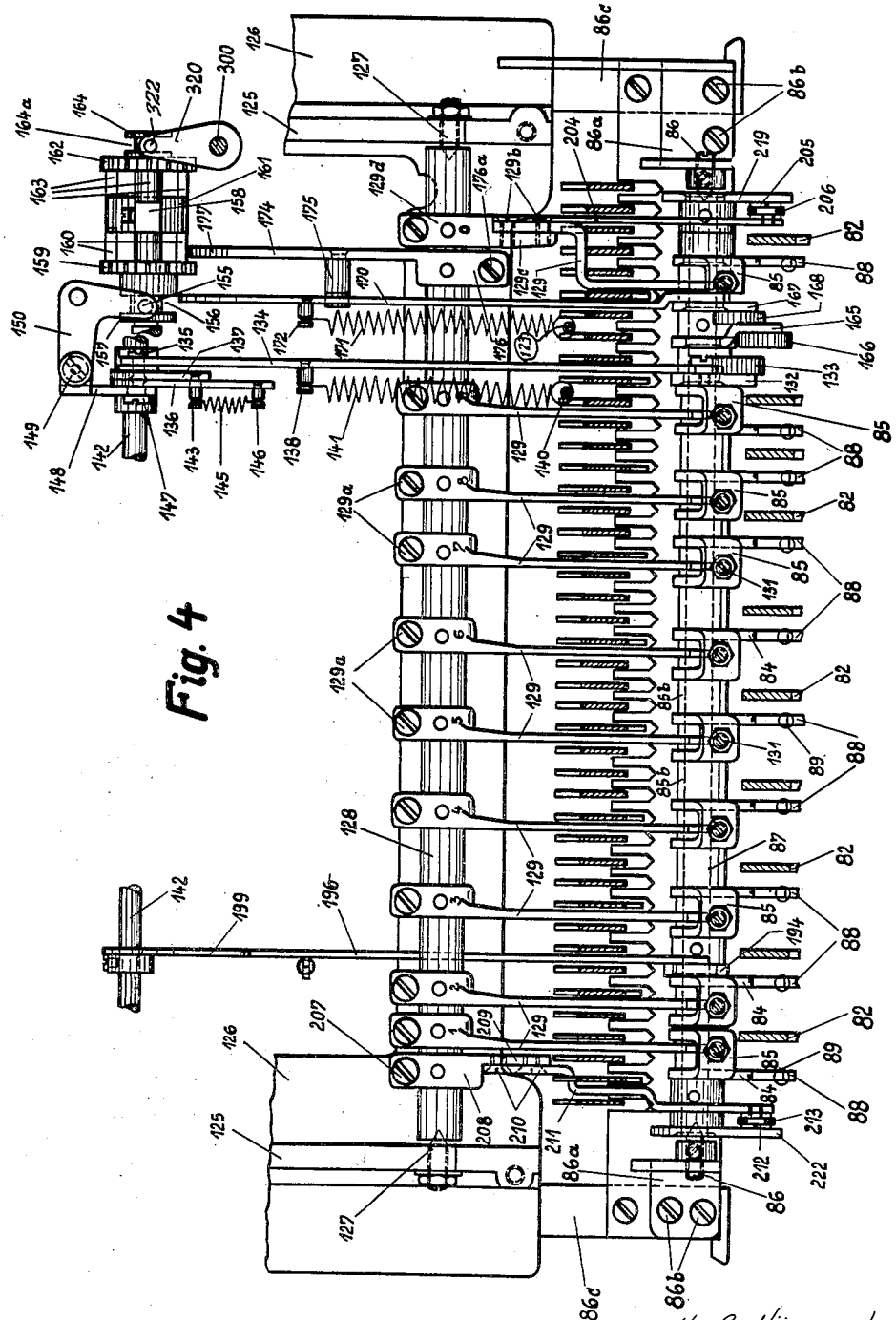

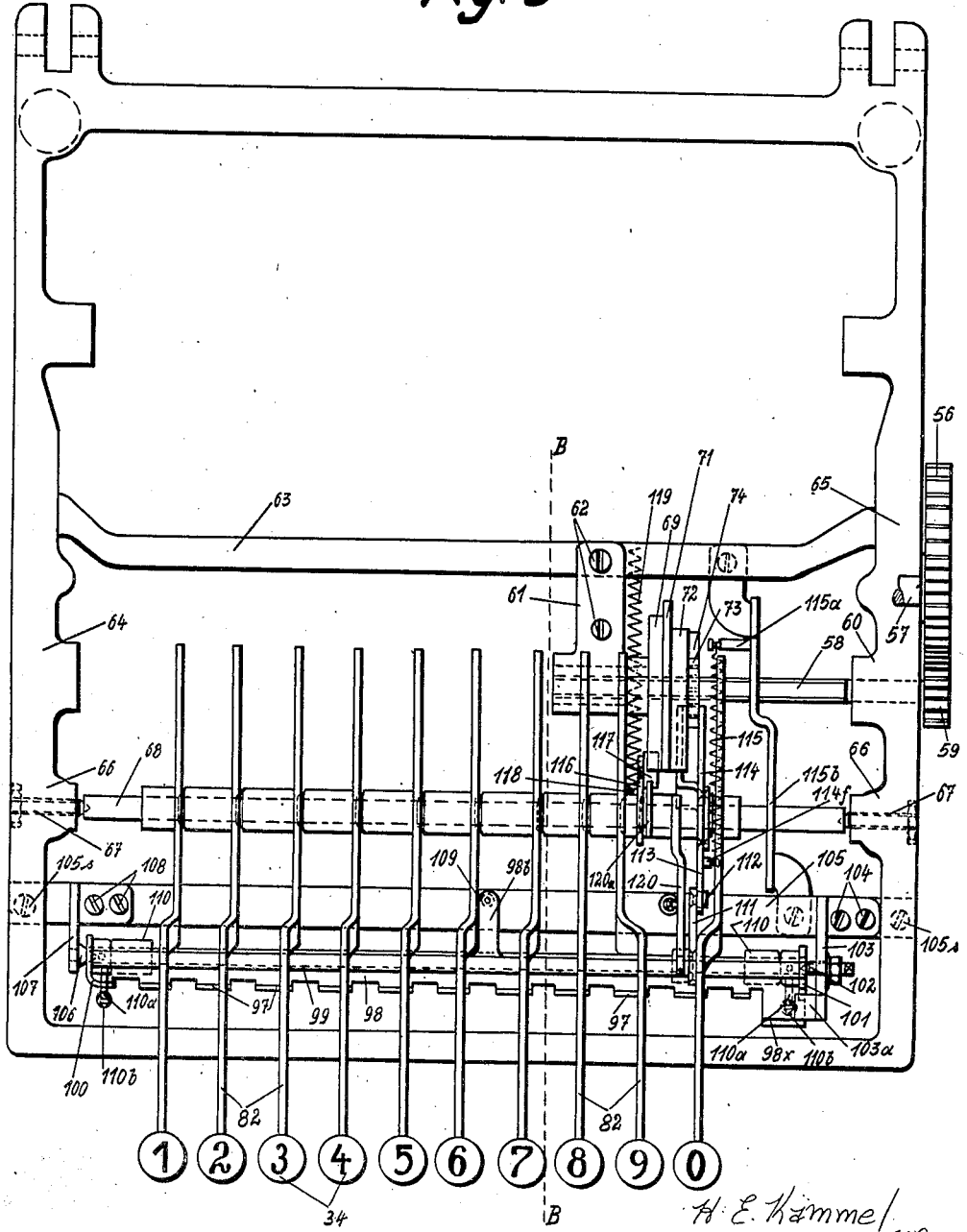

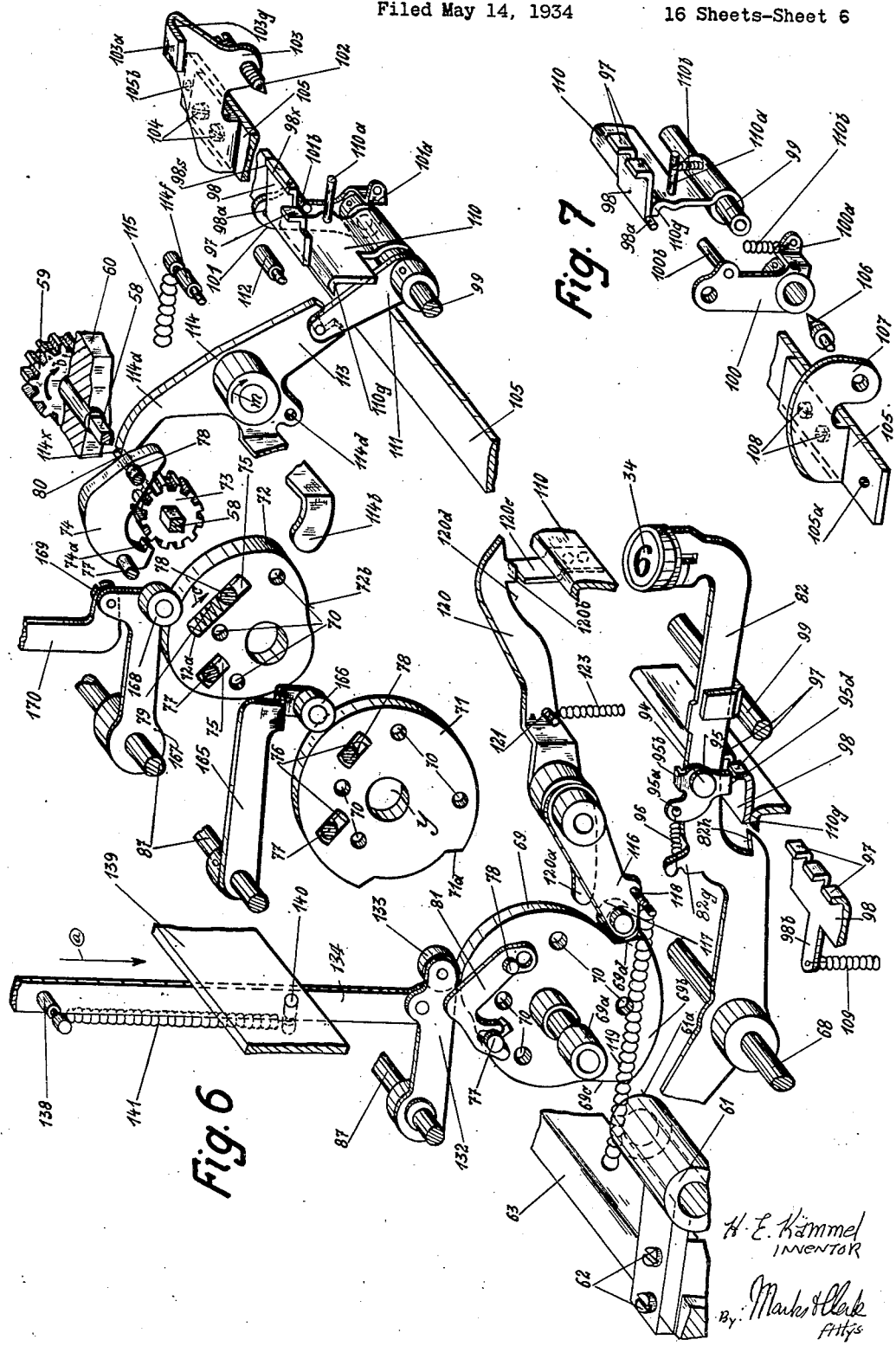

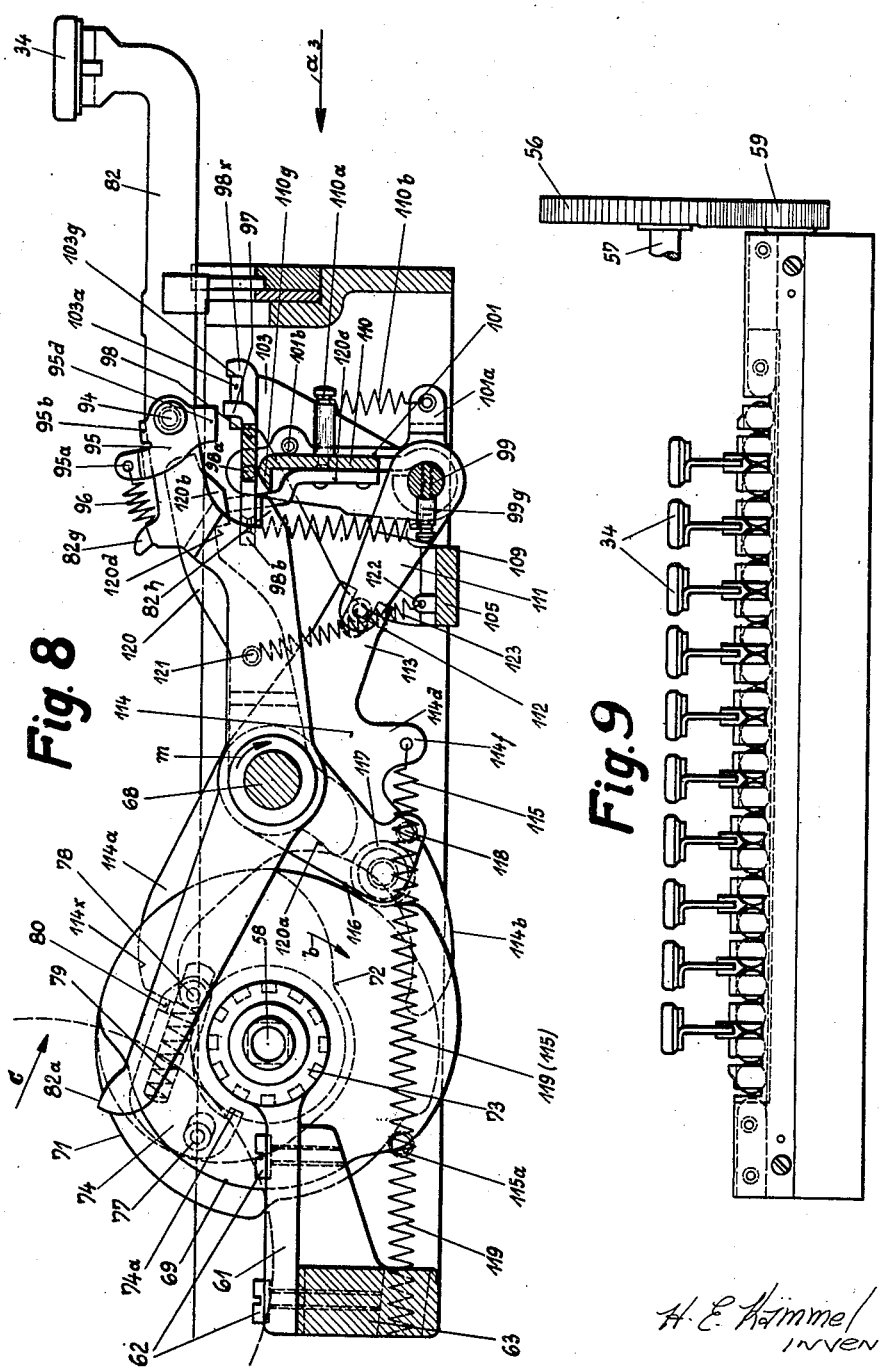

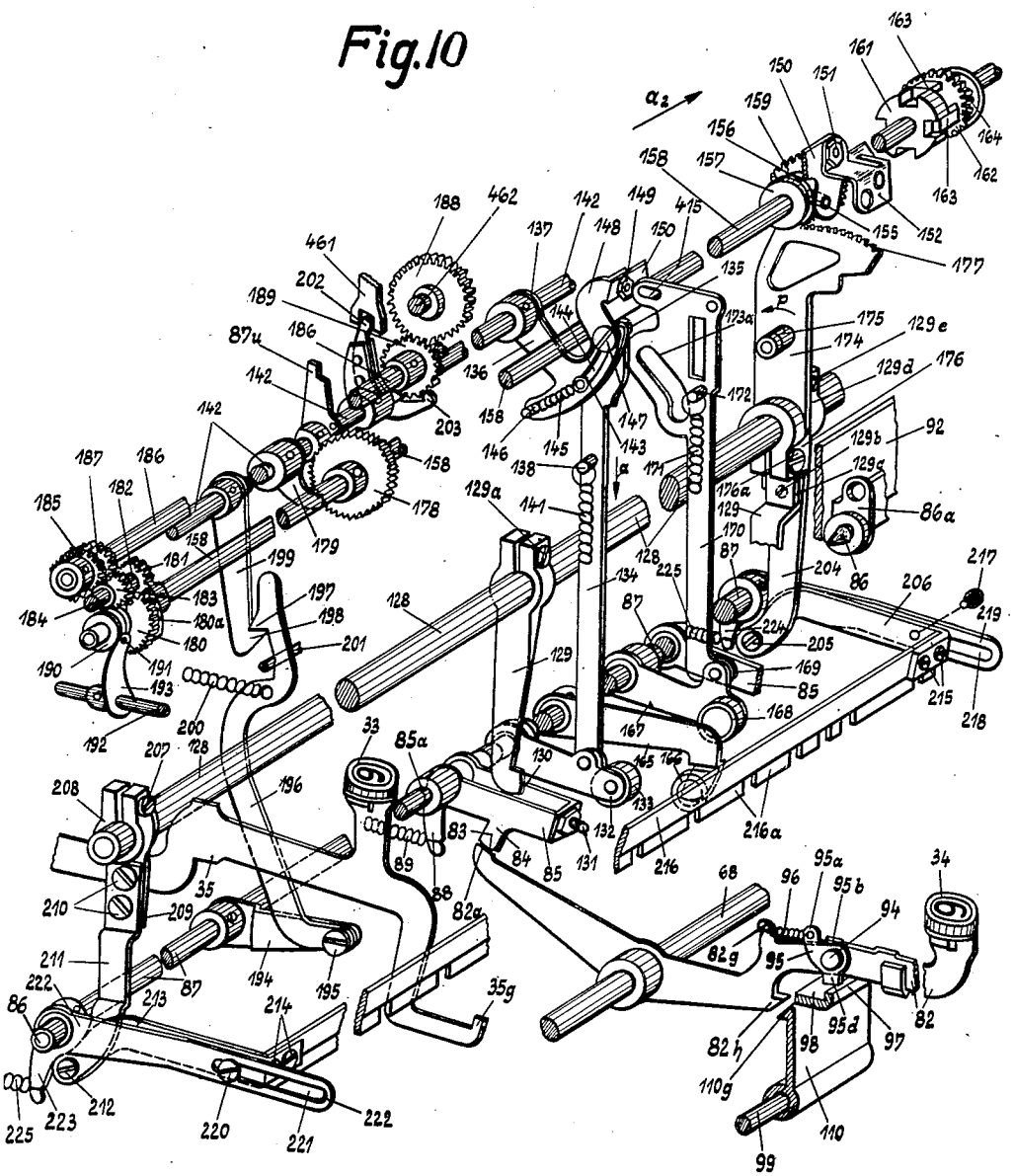

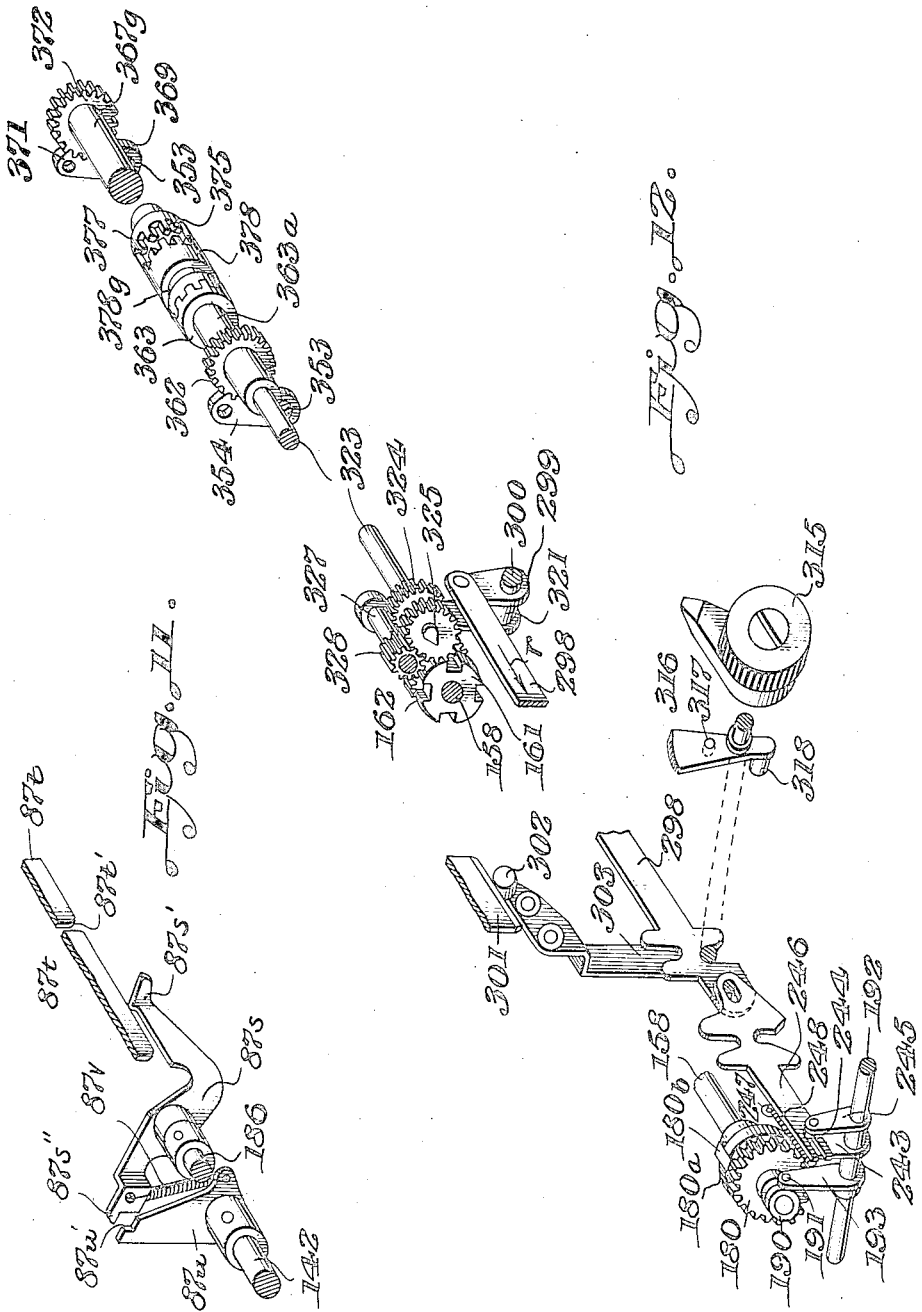

H. E. Kämmel
INVENTOR

By: Marks & Clerk
Attys.

April 1, 1941. H. E. KÄMMEL 2,236,642
TYPEWRITING-CALCULATING MACHINE
Filed May 14, 1934 16 Sheets-Sheet 11

H. E. Kämmel
INVENTOR

By: Marks & Clark
Attys

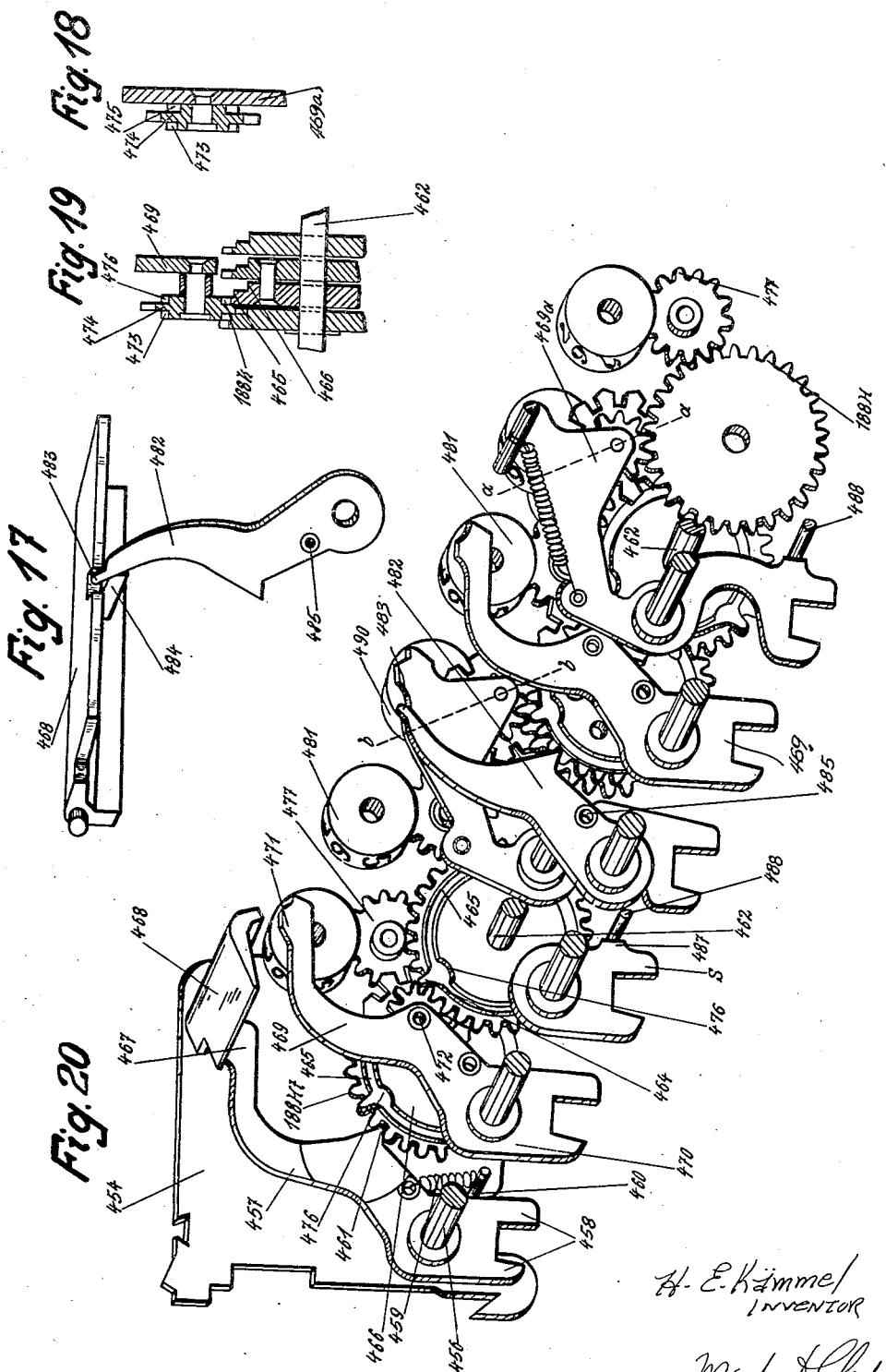

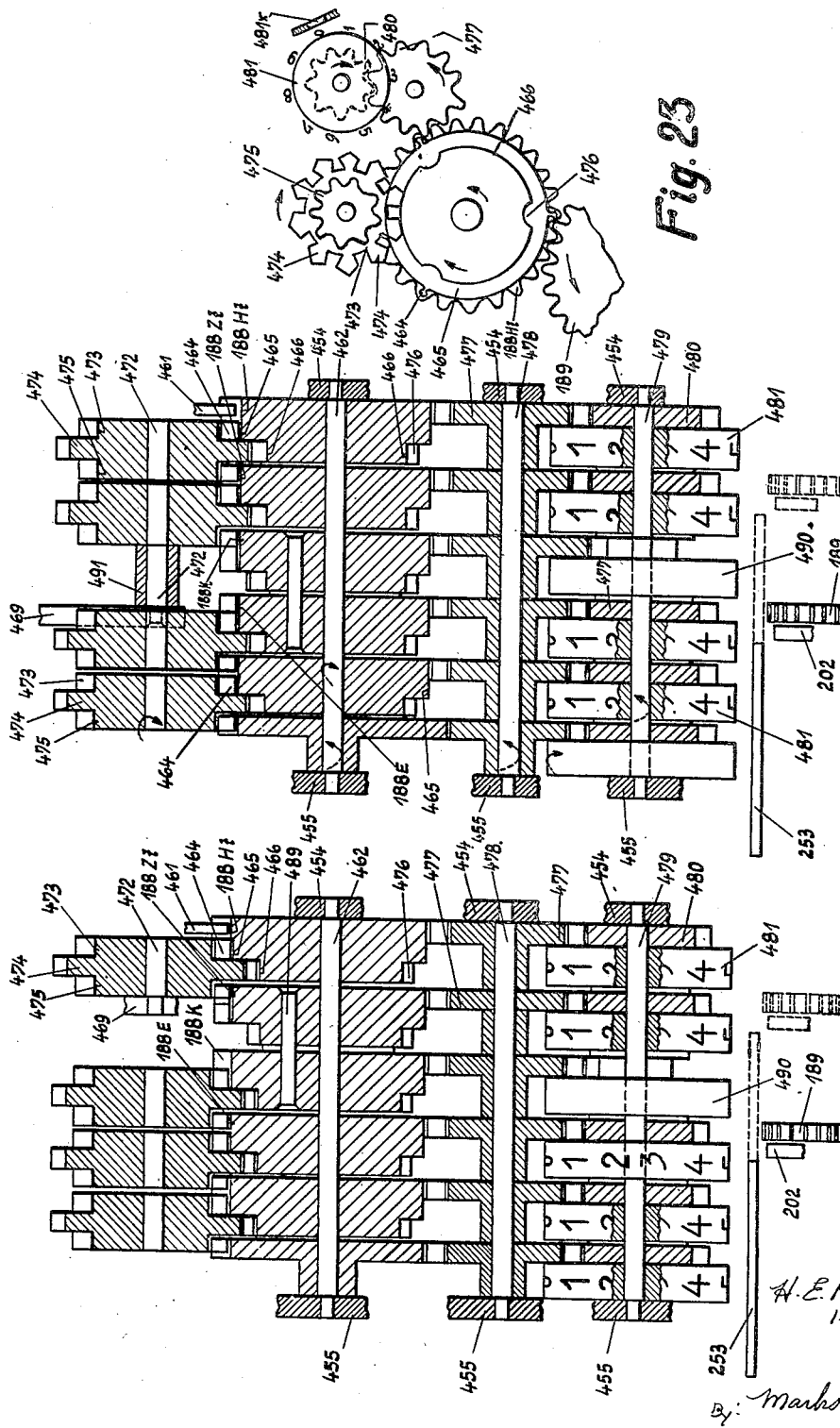

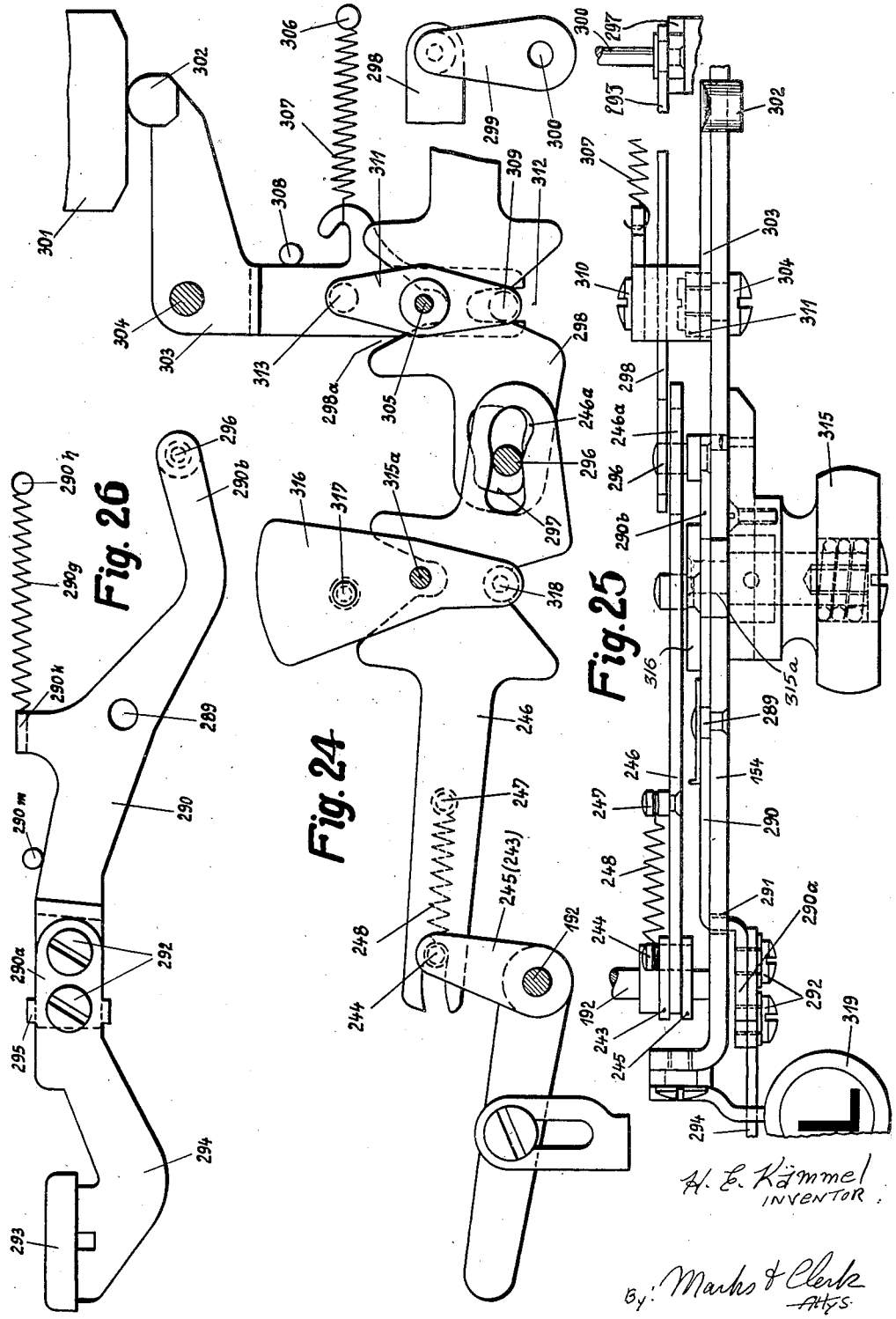

Fig. 27

| 1 | 2 | 3 | 4 | 5 | 6 | 7 | 8 | 9 | 10 | 11 |
|---|---|---|---|---|---|---|---|---|---|---|
| Name | №  | Month | Gross salary | Taxis | Sick fund | Assurance for employees | Supplements | Remainder | Net-salary | Sum of all supplements |
| O. Schmidt | 15 | May | 200.- | 10.00 | 6.00 | 4.00 | 3.75 | 0.55 | 184.30* | 4.30* |
| | | | | | | | | | | |

(Row labeled I)

Fig. 28

| Typing line | Col. | No. Column Totalizer | Reading Column Totalizer | Type of Calc. Cross-Totlr. $Q_1$ | Type of Calc. Cross-Totlr. $Q_2$ | Reading Cross Totalizer $Q_1$ | Reading Cross Totalizer $Q_2$ | Clear sign from Cross Totalizer |
|---|---|---|---|---|---|---|---|---|
| I | 1 to 3 | Name, number and month have to be registered. | | | | | | |
| I | 4 | $T_1$ | 200.00 | A | E | 200.00 | Zero | |
| I | 5 | $T_2$ | 10.00 | S | E | 190.00 | Zero | |
| I | 6 | $T_3$ | 6.00 | S | E | 184.00 | Zero | |
| I | 7 | $T_4$ | 4.00 | S | E | 180.00 | Zero | |
| I | 8 | $T_5$ | 3.75 | A | A | 183.75 | 3.75 | |
| I | 9 | $T_6$ | 0.55 | A | A | 184.30 | 4.30 | |
| I | 10 | $T_7$ | 184.30 | S | E | comes to zero | 4.30 | $Q_1$ |
| I | 11 | $T_8$ | 4.30 | E | S | Zero | comes to zero | $Q_2$ |

H. E. Kämmel
INVENTOR

By: Marks & Clerk

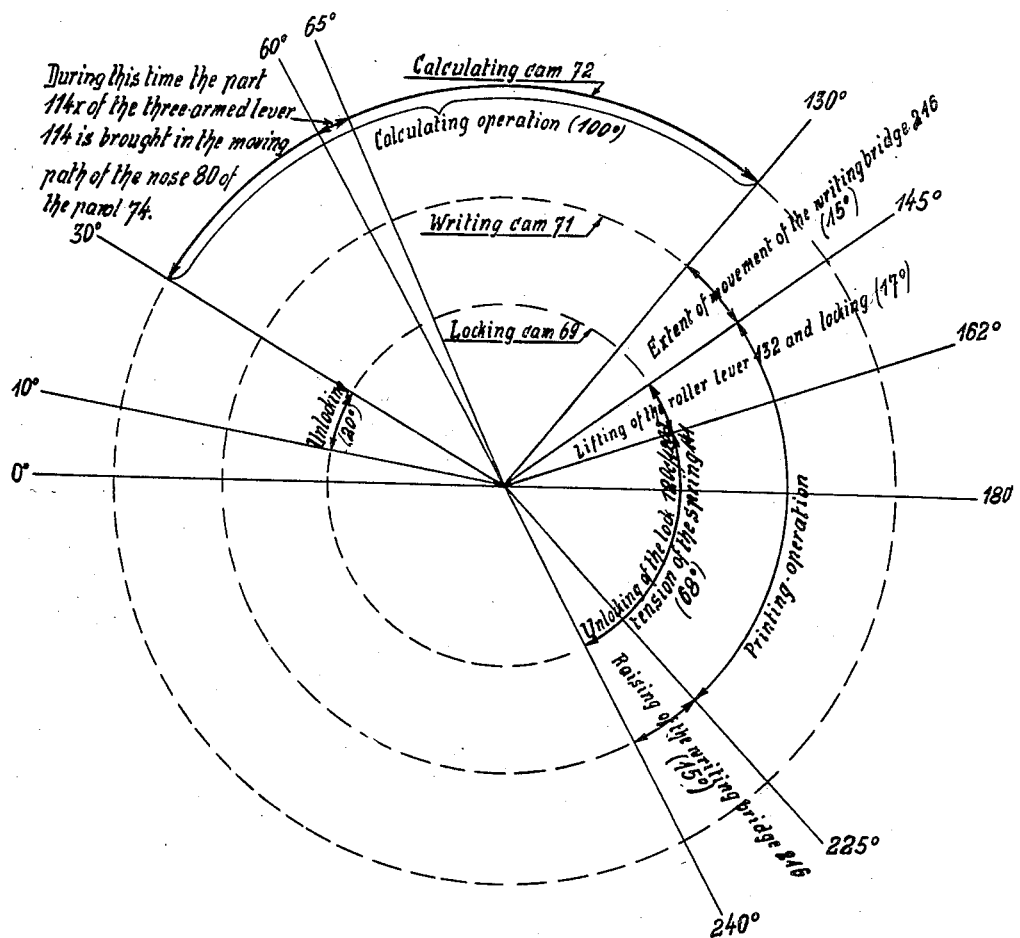
Fig: 29

Patented Apr. 1, 1941

2,236,642

UNITED STATES PATENT OFFICE 2,236,642

TYPEWRITING-CALCULATING MACHINE

Hugo Ernst Kämmel, Zella-Mehlis in Thuringia, Germany, assignor to Mercedes Büromaschinen-Werke Aktiengesellschaft, Benshausen, Thuringia Postamt Zella-Mehlis, Germany Application May 14, 1934, Serial No. 725,636
In Germany May 15, 1933

10 Claims. (Cl. 235—59)

The invention relates to a typewriting-calculating machine.

The machine according to the invention provides typing keys and numeral keys, whereby when it is desired to enter a series of items in a corresponding totalizer said items may be typed at the same time on a bill arranged in the typewriting calculating machine. This result is obtained by depression of the numeral keys, which depression causes automatically the typing of the calculated items on said bill. Such value calculating and typing mechanisms have previously been known.

They had, however, the disadvantages that their whole construction was more or less complicated, since for the value calculating and typing a great number of parts were provided. For this reason the machines were expensive in construction and their operation was unreliable.

According to the present invention these disadvantages are now obviated by providing universal members which are arranged between the calculating mechanism and the typing keys and which effect the typing and calculating operations of the items.

Figure 2 shows a plan of the machine according to Figure 1.

Figure 3 shows a left-hand side elevation of the machine.

Figure 4 shows a front elevation towards the calculating members together with the calculating segment and a part of the change-over gear for the cross-totalizers, in which view the number typing keys and the letter-typing keys are represented in section.

Figure 5 shows a plan of the drive frame together with the calculating keys and the drive coupling.

Figure 6 shows a perspective illustration viewed from the front left-hand side of the machine, of the drive coupling with the setting member, common to all the calculating keys, for the coupling, in which view the individual parts for the sake of better showing are represented drawn out from one another.

Figure 7 shows in perspective, details of the setting member, the parts of which are likewise drawn out from one another.

Figure 8 shows on an enlarged scale, a section according to the line B—B of Figure 5, viewed from the left of this figure.

Figure 9 shows on a reduced scale, a front elevation towards the calculating key lock, viewed in the direction of the arrow "$a3$" of Figure 8.

Figure 10 shows a perspective illustration of the transmission and control mechanisms arranged between the typing and calculating keys, viewed from the front left-hand side of the machine, together with the change-over gear for the column totalizers and a part of the change-over gear for the cross totalizers, in which view the individual parts are illustrated drawn out from one another.

Figure 11 shows a perspective illustration of the master locking mechanism controlled by the column totalizers, viewed from the front left-hand side of the machine.

Figure 12 shows a perspective illustration of the gear for reversing the calculating sense for the column and cross totalizers, viewed from the front left-hand side of the machine.

Figure 17 shows a perspective illustration of a locking lever with locking flap, viewed from the left-hand edge of the rear side of the totalizer.

Figure 18 shows a section according to the line $a$—$a$ of Figure 16.

Figure 19 shows a section according to the line $b$—$b$ of Figure 16.

Figure 20 shows a perspective arrangement of a totalizer viewed from the rear, in which view the detail parts are illustrated in a condition separated from one another.

Figure 21 shows a cross-section through one of the usual totalizers as hitherto used, in which view for the sake of better apprehension, the individual wheels, with their shafts, are disposed in one plane.

Figure 22 shows a similar illustration to Figure 21, of a totalizer slightly modified for the present invention, wherein the modification in spite of its apparent insignificance is nevertheless of importance.

Figure 23 shows a detail.

Figure 24 shows in front elevation the general change-over mechanism for changing-over the kind of calculation of all the totalizers.

Figure 25 shows a plan of the mechanism according to Figure 21.

Figure 26 shows the key lever for the general change-over mechanism.

Figure 27 shows a partially illustrated sheet, filled in with an example of calculation which is to find application later in the explanation of the manner of operation.

Figure 28 shows in the form of a table the shift procedure of the kind of calculation for the cross totalizers according to the example of calculation illustrated in Figure 27.

Figure 29 is an operation time diagram.

*General description of the machine*

Figure 1:
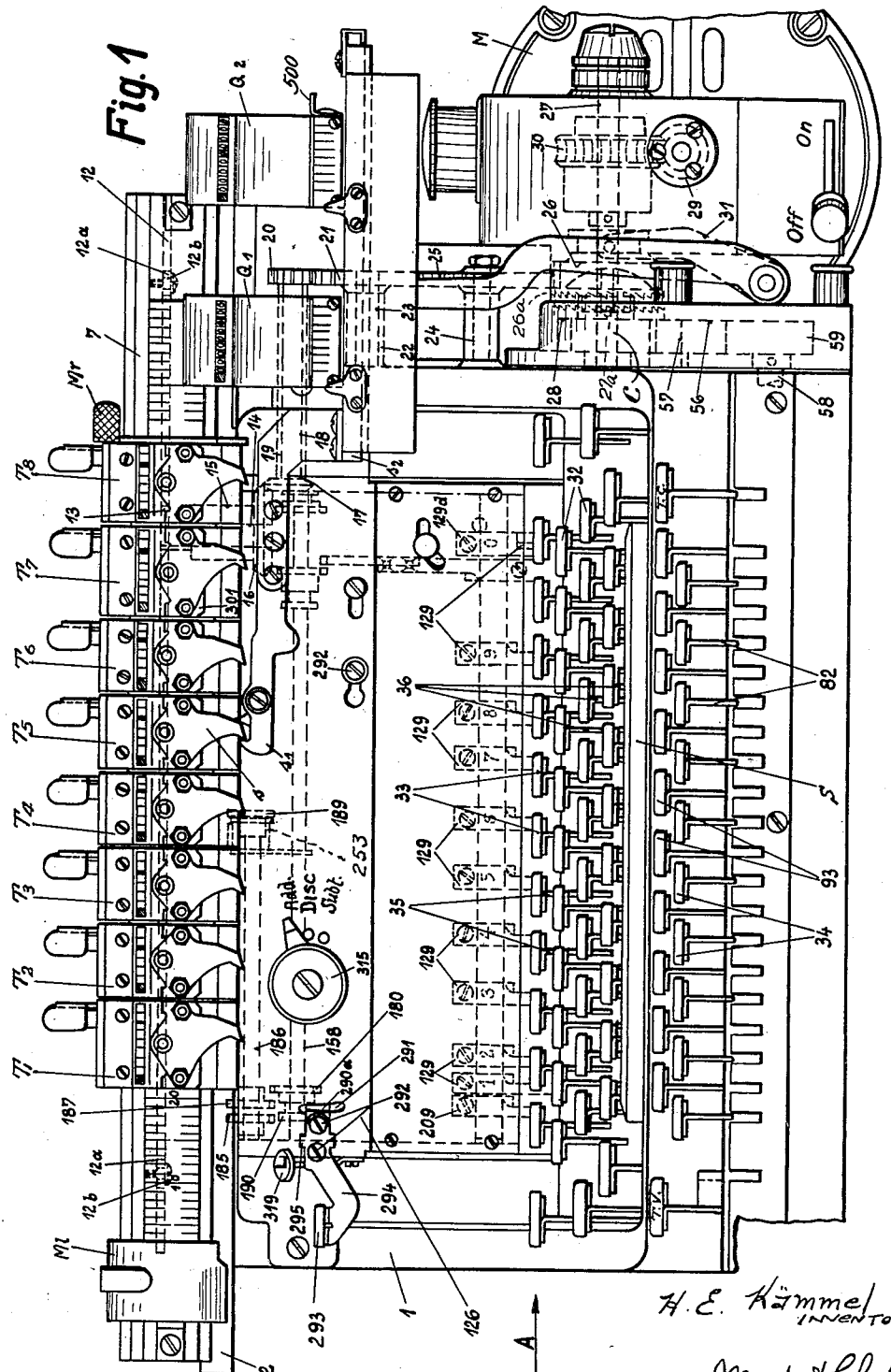
Figure 1 shows a front elevation of the whole typewriting-calculating machine.

The hereinafter described machine parts do not belong to the invention but have been briefly described for the better understanding of the parts belonging to the invention.

The machine housing 1 (Figures 1 and 3) carries by means of rails 2 and 3 the paper carriage 4, in which a platen 5 (Figure 3) is arranged. To the front side of the paper carriage, there is fixed a supporting rail 7, for carrying the column totalizers T, which will be hereinafter described in detail.

To the right-hand side of the paper carriage 4, the carriage release lever 8 (Figure 3) is swingably mounted and to an extension of this lever a carriage release bar 9, is fixed. This bar is rigidly connected at its other side with a lever 10, which is swingably mounted on the left hand side of the paper carriage, on a screw 11.

The carriage release lever 8, release bar 9 and lever 10 form part of mechanism for releasing the usual carriage escapement mechanism in the usual manner which mechanisms being well known in the art have not been illustrated in detail and need not be further described.

For the purpose of the mechanical line-shift and for the return of the paper carriage there is, further, on the carriage 4, a rack 12 (Figures 1 and 3) which is displaceably mounted by screws 12b engaging with the slots 12a. With the rack 12, engages a toothed wheel 13, which is pinned on a shaft 14. This shaft is mounted in a stationary bearing 15, and carries a rigidly mounted bevel wheel 16 on its end, remote from the toothed wheel 13. With the bevel wheel 16, engages a bevel wheel 17 (Figure 1) which is fixed on a shaft 18. The shaft 18 is rotatably mounted in a bearing 19, rigidly connected to the machine frame, and on its other end is provided with a spur wheel 20, which, on its part, engages with a spur wheel 21, which is rotatably mounted on a shaft 23, arranged in the bearing 22. The spur wheel 21, again, is in engagement with the spur wheel 25, which is rotatably mounted on the shaft 24, the spur wheel 25, on its part meshing with a spur wheel 26, formed as part of a coupling 26a. The wheel 26, is loosely rotatable and axially displaceable on a part 27 (Figure 1) of a cam shaft C (Figure 3) which drives the type levers. On the part 27, further, a second coupling half 27a is fixed which is formed similarly to the spur wheel 26, but is not axially displaceable. The shaft 27, is rotated in the direction of the arrow a (Figure 3) by means of a screw 29 (Figures 1 and 3), and a worm wheel 30, driven by a motor M which is arranged on the right-hand side of the machine.

The line shift and the carriage return is effected by bringing the coupling half 26, into engagement with the coupling half 28, by means of a lever 31, which is operated by the right-hand margin stop Mr (Figure 1). Such engagement of said halves and operation of said lever 31 operates the hereinbefore described wheel drive 13 to 26, and the rack 12, to effect line spacing of the platen 5 and the return of the carriage to the right in a manner and by associated means fully described in U. S. Patent No. 1,582,788 to which attention is directed. The opening of the coupling 26, 28 is effected by the left-hand margin stop Ml, as the paper carriage 4 runs into its extreme right-hand position to uncouple said halves 26 and 28. The typewriter mechanism proper comprises letter keys 32, number keys 33 and calculating keys 34 (Figs. 1, 2, 3 and 10) mounted upon key levers 36, 35 and 82, respectively, movable downwardly around pivot 37 against the action of springs 38. The calculating keys 34 act indirectly on the number key lever 35 in a manner and by means as described under the headings "Operation of the calculating mechanism" and "Operation of the automatic printing mechanism." In their normal positions the key levers 36, 35, 82 rest against a stop 39 (Fig. 3). By means of a pin, 40, a driving pawl 41, is mounted on each key levers, 35, 36 and this pawl is so acted upon by the tension spring 42, that its lug, 43' rests against a nose 44, of a key lever 35, 36. The nose 45, of the driving pawl, 41, engages over a nose 46, of the draw hook 49, jointed to the intermediate lever 47, by a pin 48, and the draw hook is acted upon continually round its pin 48 in the anti-clockwise direction by means of a tension spring 50, and presses upwards against a stop 51, whereby its normal position is determined.

On the draw-hook, 49, the control tooth 49c, provided with two teeth 49a and 49b, is rotatably mounted on the pin 49d. If one of the typing keys, 35 or 36 is depressed, the associated control tooth 49c moves into engagement with the cam shaft, as described in the patent to Schulze No. 1,789,661, dated Jan. 20, 1931, the control tooth 49c is first of all rotated slightly and then takes the draw hook 49 along with it to the right so that the intermediate lever 47 is swung round the shaft 52, in the clockwise direction. Accordingly, the type lever 54 is swung in the anti-clockwise direction round the shaft 55, and strikes against the platen 5.

The spur wheel 28 (Figures 1 and 3) which is non-rotatably mounted on the shaft 27 (Figure 1) engages with a spur wheel 56, which is rigidly mounted on the shaft 57. The spur wheel 56 again is in engagement with the spur wheel 59, rigidly mounted on the shaft 58 (Figures 1, 3, 5, 6, 8, 15 and 16).

*Calculating mechanism including locking and unlocking mechanisms for said calculating mechanism*

The calculating mechanism drive shaft 58 (Figures 3, 5, 6 and 8), on one hand, is rotatably mounted in the bearing eye 60, arranged in the right hand side of the machine housing 1, and on the other hand, the part 58a, of the shaft 58, is rotatably mounted in a bearing 61, which is fixed by means of the screws 62, to a bridge 63 connecting the two side walls, 64 and 65. Another shaft, 68 (Figures 3, 5, 6, 8, 10) is rigidly mounted by means of set screws 67, screwed into bosses 66 (Figure 5) on the left and right hand side walls 64 and 65 of the machine housing 1, and on this shaft, members to be hereinafter described, are swingably mounted.

In the bearing eye 61 (Figures 3 and 6), a cam 69 (Figures 3, 5, 6 and 8) is rotatably mounted by means of the sleeve 69a, rigidly fixed to the cam. The cam 69, is rigidly connected to the cams 71 and 72, by means of screws (not illustrated) which pass through holes 70, of the cams. The shaft, 58, however, remains without any action on the cams, since the cams 69, 71 and 72, as well as the sleeve, 69a, have greater bores $y$ (Fig. 6) than the diameter of the shaft 58. The cams 69, 71 and 72 are prevented from lateral displacement, on the one hand, by contact of the side 69b, of the cam 69, with the edge 61a, of the bearing eye 61 and on the other hand, by contact of the cam 72, with the toothed wheel 73, non-rotatably mounted on the square shaft 58. The toothed wheel 73 participates in the rotation of the square shaft 58 which continually rotates in the arrow direction $b$ (Fig. 6). On the cam 72, a pawl 74 (Figures 5, 6 and 8) is displaceably arranged by means of pins, 77 and 78, which engage in elongated slots 75 of the cam 72, in elongated slots 76, of the cam 71 and in elongated slots (not illustrated) in the cam 69. The pawl 74, is acted on continually in the direction of the arrow $c$ (Figures 6 and 8) by a compression spring 79, which, on the one hand, abuts against the pin 78, fixed to the pawl 74, and on the other hand abuts against the face 72a, of the slot 75, in the cam 72. Moreover, a stud 80 formed on the pawl 74, co-acts with a part, to be hereinafter described in detail, by means of which the tooth 74a, of the pawl 74, is held out of engagement with the toothed wheel 73. In ring grooves (not illustrated) in the ends of the pins, 77 and 78 of the pawl 74, which project from the left-hand side of the cam 69, a locking member 81, is fixed, in the manner illustrated in Figure 6, so that the pawl 74, always remains in connection with the cams 69, 71 and 72, and the pawl 74 is prevented from falling out. It may be remarked at this point that for the whole ten calculating keys 34, only one coupling as just described, is necessary.

The ten calculating key levers 82 (Figures 1, 2, 3, 5, 6, 8 and 10) which carry the calculating keys 34, are swingably mounted on the shaft 68, already mentioned. The rearwardly directed limbs of the calculating key levers 82, are somewhat upwardly bent at their ends, and have arched surfaces 82 (Figure 8) which co-act with arched surfaces 83 (Figure 10) of the downwardly directed projections 84, of the U-shaped stop members 85. The latter are swingably mounted on a shaft 87 (Figures 3, 4 and 10) which is rotatably mounted by means of two set screws 86 (Figures 4 and 10). Each of the set screws, 86 is screwed into a corresponding angle member 86a (Figure 4) the angle members being fixed by means of screws 86b to both side members 86c of the cradle housing. The stop members, 85, moreover, are held in position in the axial direction by means of distance pieces 85b (Figure 4), arranged on the shaft 87.

On the left-hand limbs of the stop members 85, which correspond to the value "1" and "9" and on the right-hand limbs of the stop members 85 (Figure 4) which correspond to the values "2" to "8," projections 88 (Figures 3, 4 and 10), are arranged, with which engage springs 89, the springs on the other hand being connected to pins 90 (Figure 3). The pins 90, are riveted into angle members 91 (Figure 3) which, again are screwed by means of screws 91a, to a bar 92 (Figures 3 and 10) attached to the two side walls of the machine frame in any suitable manner. By means of these springs, 89, the stop pieces 85, are acted on in the clockwise direction round the shaft 87, so that they rest with their faces 85a (Figure 3), against the bar 92, whereby the normal position of these stop members 85 is determined. Since the calculating key levers 82, are acted upon by their own weight in the clockwise direction round their pivot shaft 68, and consequently rest with their arched faces 82a, against the arched faces 83, of the stop members, so that normal position of the calculating key levers 82, is hereby determined. A depression simultaneously of two calcualting keys 34, or of a calculating key 34 and a decimal tabulator key 93 (Figures 1 and 2) is rendered impossible by the generally known roller key lock of the Mercedes Addelektra machine illustrated in Figure 9.

On each calculating key lever 82, a pawl, 95 is swingably mounted by means of a rivet 94 (Figures 3, 6, 8 and 10). With the nose 95a of this pawl, a spring 96, engages which, on the other hand, is connected to a nose 82g, arranged on the key lever 82. By means of this spring 96, the pawl 95, is acted on in the anti-clockwise direction round its rivet 94. The normal position of the pawl 95, is determined by the contact of the right-angled bent nose 95b, on the upper edge of the key lever 82. The downwardly directed end 95d of the pawl 95, is capable of co-acting with the right-angled upwardly-bent nose 97, of a bar 98. On the right and left hand ends of the bar 98, pins 98a (Figures 6 and 7) are formed, one pin being arranged at each end. By means of these pins, the bar 98, is swingably mounted on the levers 100 and 101, rigidly mounted on both ends of the shaft 99. The shaft 99 at its right hand side, is rotatably mounted by means of a set screw 102 (Figure 6) in a bearing member 103, which is fixed to a bar 105, by means of screws 104. On the left-hand side of the machine, the shaft 99 is rotatably mounted by means of a cone bearing 106 (Figure 7) in a bearing member 107, which is fixed with screws 108, to the bar 105, already mentioned. The bar 105 is fixed to both side walls 64 and 65 of the machine housing 1, by means of screws 105s (Figure 5) which pass through holes 105a and 105b (Figures 6 and 7) of the bar 105.

By means of a spring 109, which, on the one hand, engages with a lug 98b of the bar 98, and, on the other hand, is connected to a pin 99g (Figure 8) rigidly fixed to the shaft 99, the bar 98, is acted on in the anticlockwise direction round its pins 98a, so that its upper surface presses upwards against a bent lug 103a on the bearing block, 103, whereby the normal position of the bar 98, is determined.

A locking bar 110 (Figures 3, 6, 7 and 8) is swingably mounted at both its ends on the shaft 99, in the manner indicated in Figures 6 and 7. At the right-hand and left-hand ends of the locking bar 110, further, pins 110a are fixed, with each of which a spring, 110b, (in Figure 6 this has not been illustrated for the purpose of rendering other parts visible), engages, which spring on the other hand, is connected to bent lugs 100a or 101a of the levers 100 and 101. By means of these springs 110b the locking bar is always acted upon round the shaft 99 in the clockwise direction, whereby its normal position is determined, on the one hand, by contact with the pin 100b, riveted to the lever 100 and, on the other hand, by contact with the pin 101b riveted to the lever 101. The right-angled limb 110g, is capable of co-acting with the noses, 82h (Figure 6) formed on the calculating key levers 82, in a manner to be hereinafter described.

On the shaft 99 (Figures 3, 6, 7 and 8) further, a lever 111 is rigidly mounted to the free end of which a pin 112 is riveted (in Figure 6 for the sake of illustration the same is indicated in the withdrawn position). The pin 112 of the lever 111, co-acts with the fork-shaped end of an arm 113, of a three-armed lever 114, which is swingably mounted on the shaft 68. The arm 114a of the three-armed lever 114, co-acts with the stud 80, already mentioned, of the pawl 74, while the arm 114b, of the same, co-acts with the cam 72, in a manner hereinafter described. A spring 115 engages with a pin 114f (in Figure 6, the pin 114f is shown removed from the lever 114 for purposes of illustration) riveted to the nose 114d (Figure 6), the spring at its other end being connected to a pin 115a (Figure 5) on a stay 115b, which is fixed to the part 63 and to the cross stay 105. By means of this spring, the three-armed lever 114, is acted on in the clockwise direction round the shaft 68, in consequence of which the lever 111 connected to it, the shaft 99, and the levers 100 and 101 pinned to it, the locking flap 110, and finally the bar 98, are acted upon in the anti-clockwise direction, whereby on the one hand, the upper face of the lug 98x, under the action of the spring 109, and on the other hand, its edge, 98a under the action of the spring 115, contacts with the edge 103g of the lug 103a, of the bearing member 103, whereby the normal position of the parts 114, 111, 99, 100, 101, 110 and 98, is determined.

Further, on the shaft 68, a lever 116 (Figures 3, 6 and 8), is swingably mounted, at the free end of which a roller 117 is arranged, which is capable of co-acting with the cam 69. By means of the spring 119 which, on the one hand, engages with the pin, 118 of the lever 116, and, on the other hand, is connected to the part 63, the roller 117, is always maintained in contact with the cam 69.

The lever 120, which similarly is swingably mounted on the shaft 68, is likewise capable of co-acting by means of its rearwardly directed arm, 120a (Figure 8) with the cam 69. By means of the spring 123 which, on the one hand, engages with the pin 121 and, on the other hand, is connected to a pin 122 (Figure 8) of the bridge 105, the lever 120, is acted on in the clockwise direction round the shaft 68, whereby the projection 120b of this lever contacts with a part 120c, fixed to the locking bar 110, and the normal position of the lever (Figure 8) is thereby determined.

By means of the set screws 127, screwed into the two side walls 125 (Figure 4) of the calculating mechanism 126 (Figures 1, 3, 4 and 10) a shaft 128 is freely rotatable. To this shaft, 128, feeler fingers 129 are mounted so as to be capable of being adjusted and fixed in position, and these fingers are forwardly bent at right angles at their downwardly-directed ends and are capable of co-acting by means of their slightly arched faces 130, with the stop pins 131 (as best shown in Figure 9) arranged on the stop members 85. The stop pins 131, are mounted so as to be adjustable. The right-angled forwardly bent parts of the feeler fingers 129, are formed of different lengths (Figures 3 and 16) correspond to the values "1" to "9," and the feeler finger 129, lying farthest to the left (Figures 4 and 16) is the longest, and the right-angled bent part corresponding to the value "9" of the feeler finger 129, which is located on the shaft 128 at the right hand side of the machine to the left of the feeler finger 129 corresponding to the value "9," is the shortest.

The feeler finger 129, corresponding to the value "0" is arranged so as to be capable of being fixed by means of screws 129b (Figures 4 and 10) to a part, hereinafter described in detail, fixed to the projection 129c of a clamping member 129d. As the feeler finger 129, corresponding to the value "0" may not be allowed to execute any swinging movement, calculating sector 174 would be swung therewith and in this manner a wrong value would be registered and therefore the right-angled bent part of the feeler finger 129 (Fig. 16) corresponding to the value "0" is still longer than the right-angled bent part of the feeler finger 129, corresponding to the value "1."

The lever 87s, fixed on a shaft 142, co-acts with a locking lever 87u, mounted on the shaft 142, which locking lever is connected with the lever 87s by a spring 87v. If no bar 87t, of a column totalizer lies over the nose 87s' of the lever 87s or if the nose 87s' lies in the intermediate space 87t' of two bars 87t, so the nose 87s'' of the lever 87s, lies in the stop 87u' of the lever 87u under the action of the spring 87v, whereby the rest position of the lever 87s is determined.

A roller lever 132, is loosely rotatable on a shaft 87 (Figures 6 and 10) and on the free forwardly-directed end of this lever, a roller 133, is mounted, which is capable of co-acting with the cam 69, hereinbefore described. To the roller lever 132, is joined a draw-bar 134 which, at its upwardly directed free end, is jointed by means of a screw 135 (Figures 3, 4 and 10) to the lever 137, which is loosely rotatable on the locking shaft 142. By means of a spring 141, which, on the one hand, engages with the pin 138, rigidly mounted on the draw-bar and, on the other hand, is connected to a pin 140, rigidly mounted on the front wall 139 (Figures 3 and 6) of the calculating mechanism 126, the draw-bar 134, is acted upon always in the direction of the arrow a (Figures 6 and 10), so that the roller 133, is always maintained in contact with the cam 69.

The locking shaft 142, is arranged so as to be loosely rotatable by means of set screws (not illustrated) on the two side walls 125 of the calculating mechanism 126. To the lever 137, a pin 143, is fixed, which projects through an elongated hole 144, of a lever 136, rigidly mounted on the locking shaft 142. A spring 145, engages with the pin 143, of the lever 137, the other free end of the spring being connected to a pin 146, fixed to the lever 136, whereby both levers 136 and 137 are yieldingly connected to one another.

Figure 16:
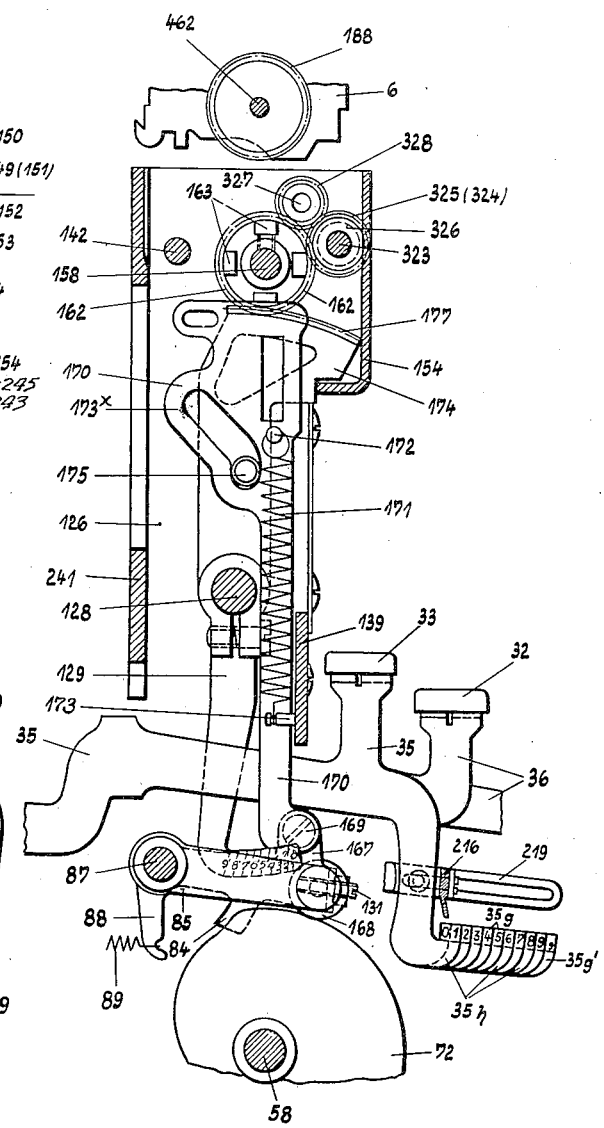

To the lever 136, a connecting member 148, is jointed by means of a screw 147, and this member is jointed to an angle lever 150 (Figures 4, 10 and 15) by means of a screw 149. The lever 150, again, is swingably mounted by means of a screw 151, on an angle member 152, which is fixed by means of screws 153 (Figure 15) to the front wall 154. To the angle lever 150 (Figure 10) is fixed a pin 155, which projects into a ring groove 156, of a sleeve 157, and this sleeve is arranged so as to be axially displaceable on a shaft 158, mounted in any suitable manner in the two side walls 125, of the calculating mechanism 126. With the sleeve 157, a wheel 159, likewise mounted so as to be axially displaceable on the shaft 158, is in fixed connection. Pins 160 (Figure 4) are arranged on the toothed wheel 159, and these pins are always in engagement with a claw 161 (Figures 4 and 10) rigidly mounted on the shaft 158. Further, on the shaft 158, is arranged a toothed wheel 162, the pins 163 of which are likewise in engagement with the claw 161 (Figures 4, 10 and 16). The toothed wheel 162, is rigidly connected to a ring grooved sleeve 164 (Figure 4) which is arranged so as to be axially displaceable on the shaft 158.

On the shaft 87 (Figures 4, 6 and 10) there is rigidly mounted a lever 165, on the free downwardly projecting end (Figure 6) of which a roller 166, is arranged, and this roller is capable of co-acting with the cam 71, hereinbefore described. The lever 165 is, moreover, fixed on the shaft 87, in such a manner that its roller 166, is normally in contact with the cam 71.

Besides, on the shaft 87 (Figures 4, 6, 10 and 16) a lever 167, is arranged, so as to be loosely rotatable thereon. To the lever 167 a roller 168, is attached, so as to be rotatable, and this roller is capable of co-acting with the cam 72, hereinbefore described, in a manner to be hereinafter described in detail. To the lever 167, a slide 170 is jointed by means of a headed screw, 169. By means of a spring 171, which on one hand is connected to a pin 172, arranged on the slide 170 and, on the other hand, engages with a pin 173 (Figure 4) arranged on the front side of the calculating mechanism, the slide 170, is always acted upon downwards in the arrow direction $a$, whereby the roller 168 of the lever 167, is always held in contact with the cam 72. The slide 170 is provided with an elongated hole 173$x$, formed correspondingly to that in Figures 10 and 16, into which hole projects a roller 175, mounted on the calculating sector 174. The calculating sector 174 is arranged so as to be capable of adjustment and of being fixed in position on the shaft 128, by means of a screw 176$a$. The upwardly directed part of the calculating sector 174, is provided with teeth 177, with which the main driving wheel 159, hereinbefore described, is capable of being moved into engagement.

The toothed sector 174 (Figures 3, 4, 10 and 16) which is actuated on striking a calculating key 34, in a manner to be hereinafter described, transmits the swinging movement corresponding to the value of the struck key, by way of the toothed wheel 159, and shaft 158, to a locking wheel 178 (Figure 10) rigidly mounted on the shaft 158, which locking wheel is always in engagement with a guide and locking tooth 179. Further, on the shaft 158, a toothed wheel 180 is mounted so as to be capable of axial displacement. This is normally in engagement with a toothed wheel 181, which is integrally formed with a hollow shaft 182, and a toothed wheel 183. The unit 181, 182 and 183 is rotatably mounted on a shaft 184, fixed in the left-hand wall 125 (Figure 4) of the calculating mechanism. The toothed wheel 183, again, is in engagement with a toothed wheel 185, which is rigidly mounted on a shaft 186. The shaft 186, is rotatably mounted in the left-hand side wall 125 of the calculating mechanism and in a bearing member (not illustrated) arranged approximately at the centre.

Beside the toothed wheel 185, there is a further toothed wheel 187, mounted so as to be non-rotatable on the shaft 186. Further on the shaft 186, a master wheel 189 (Figures 10 and 15) is rigidly mounted, which comes into engagement with the toothed wheels 188, (Figures 3 and 15) of the column totalizers T, in the working position.

On the wheel 180, a ring grooved sleeve 190 is rigidly mounted into which projects a pin 191, of a lever 193, rigidly mounted on the shaft 192, which is rotatably mounted in the calculating mechanism. The driving of the toothed wheel 180 (Figure 10) on a rotational movement of the shaft 158, is effected by a coupling disc 180$a$, pinned to the shaft 158, into which disc engage claws 180$b$, rigidly connected with the toothed wheel 180. On the shaft 87 (Figures 3 and 10) there is rigidly mounted a lever 194, to the free upwardly directed end of which, a draw-bar 196, is jointed by means of the screw 195. A nose 197, of the draw-bar 196, engages over a nose 198, of a lever 199, rigidly mounted on the shaft 142. By means of a spring 200, which engages with the draw-bar 196, and which on the other hand is connected in the calculating mechanism in any suitable manner, the lever 196, is normally swung about the screw 195, in the anti-clockwise direction, whereby the lever 196, is normally positioned so that its nose 197, always remains in engagement with the nose 198, of the lever 199. The lever 196, rests against a pin 201, arranged in any suitable manner in the calculating mechanism.

On the shaft 142 (Figures 3, 10 and 15) there is fixed a release finger 202 which is capable of acting on a locking lever 461, arranged in the totalizers T1 to T8 in a manner to be hereinafter described. Further on the shaft 142 there is a locking tooth 203, rigidly mounted, which is capable of co-acting with the main driving wheel 189, rigidly mounted on the shaft 186.

*Operating mechanism for the printing mechanism for automatic operation of the printing mechanism under the control of the calculating mechanism*

On the clamp 129$d$ (Figures 4 and 10), as already hereinbefore described, a member 204, is also mounted by means of screws 129$b$, and to the free downwardly projecting part of the member 204, which is somewhat bent at the rear, a member 206 is jointed by means of a screw 205. On the left-hand side of the machine, a clamp 208, is arranged, so as to be capable of adjustment and to be clamped in position by means of a screw 207. To the projection, 209 of the clamp 208, a part 211, correspondingly formed to that in Figure 9 is fixed by means of screws 210, and to the free downwardly projecting end of the part 211, there is attached a part 213, by means of a screw 212. A bar 216, correspondingly formed to that in Figure 9, is fixed to the part 213, by means of screws 214, and to the part 206, located at the right hand side of the machine by means of screws 215, so that a frame consisting of the parts 208, 211, 213, 216, 206, 204 and 129$d$, is formed.

The part 206 (Figure 10) located on the right-hand side of the machine, moreover, is guided by means of a headed screw 217, which projects through an elongated slot 218, of a lever 219, rigidly mounted on the shaft 87, and the part 213, arranged on the left-hand side of the machine of the frame, is guided by means of a headed screw 220, which projects through an elongated slot 221, of a lever 222, rigidly mounted on the shaft 87, so that the frame 213, 216, 206, is prevented from swinging downwardly round the screws 212 and 205. With the arm 223 of the lever 222, and with the arm 224 of the lever 219, engage springs, 225, one spring with each arm, which springs are connected at their free ends in any suitable manner in the machine housing, and these springs act upon the levers 222 and 219 and consequently upon the frame 213, 216, 206 in the clockwise direction. The swinging movement in the clockwise direction, however, is normally prevented by the draw-bar 196, the nose 197 of which engages over the nose 18 of the lever 199. The bar 216 of the frame 213, 216, 206, in a manner to be described later, is capable of co-acting with the noses 35g formed on the downwardly and forwardly extending number key levers 35 (Figure 16). Moreover the noses 35g are arranged on horizontal parts 35h of different lengths of the number key levers 35, the lengths of these parts corresponding to their values "0" to "9," and the horizontal part 35h corresponding to the value "0" (Figures 3 and 16) is formed as the shortest and the horizontal part corresponding to the value "9" as the longest.

*Mechanism for reversing the calculating operation by hand or automatically*

On the shaft 192 (Figures 24 and 25) mounted in the front wall 154, and in the back wall 241 (Figures 15, 16) of the calculating mechanism 126, the swingable lever 193 (Figure 12) already described, is rigidly mounted, and is rigidly connected by means of a sleeve 242, with the lever 243, which is likewise swingable with the shaft 192. The lever 243 again is connected by means of a pin 244, with the lever 245, which is swingably mounted on the shaft 192. The pin 244 is embraced by a fork-shaped end of a control lever 246 (Figures 12 and 24). With the pin 244 (Figure 25) a spring 248 engages, which is connected to the pin 247, mounted on the control lever 246, whereby the control lever 246 is acted on towards the left (in Figure 24) and the levers 245, 243 towards the right, so that the same are always held in contact with the control lever 246.

In the upper part of the calculating mechanism 126 (Figure 3) a lever 290 (Figures 25 and 26) is swingably mounted on the inner side of the front wall 154 of the calculating mechanism 126 on the pin 289 (Figure 26) and to the limb 290a of this lever, which projects from an opening 291 (Figures 1 and 25) of the front wall 154 of the calculating mechanism 126, a key lever 294, carrying the general reverse key 293 is attached by means of screws 292, in which arrangement lugs 295, arranged on the key lever 294, engage over the limb 290a, of the lever 290. The lever 290 is held in its normal position illustrated in Figure 1, by means of a spring 290g (Figure 26) which, on the one hand engages with a pin 290h, mounted in the front wall 154 (Figure 25) of the calculating mechanism 126 and on the other hand, is connected to a right-angled bent lug 290k on the lever 290, the normal position being determined by the lever 290, striking on a pin 290m, likewise fixed in the front wall 154 (Figure 3) of the calculating mechanism 126 (Figure 3).

To the free limb 290b, which projects to the right, of the lever 290, there is riveted a pin 296, which projects into a slot 246a (Figures 25 and 25) of the control lever 246, already described.

The pin 296 of the lever 290, further, projects into a slot 297, of a control member 298, which at its right-hand end is jointed to a lever 299, (Figures 24 and 25). The lever 299, is rigidly mounted on a shaft 300, which is mounted in bearings in the front wall 154 and in the rear wall 241 of the calculating mechanism 126.

On the supporting rail 7 (Figures 1 to 3) of the paper carriage 4, as already stated, the column totalizers T are removably mounted. On the column totalizers T, pre-setting plates 301 (Figures 1, 12 and 24) are mounted by means of which the control of the type of calculation of the associated column totalizer located in the working position is effected for addition or subtraction. The pre-setting plate 301 of one of the column totalizers T (Figure 1) which is directly in the working position, moreover, acts on a part 302 (Figures 12 and 24) of an angle lever 303, which is mounted, by means of a screw 304, on the front wall 154, of the calculating mechanism 126. By means of a spring 307, which engages with the lever 303, and is connected to a pin 306, fixed in the front wall 154 of the calculating mechanism 126, the parts 303 and 298, are held in their normal position illustrated in Figure 24, the normal position being determined by striking on a pin 308, arranged in the front wall 154 of the calculating mechanism. The lever 303 (Figure 24) is of fork-shape at its lower end and embraces with the same a pin 309, of a control lever 311, swingably mounted, by means of a screw 310 (Figure 25), on the front wall 154 of the calculating mechanism 126. While the pin 309 is capable of coacting with the V-shaped recess 312 of the control lever 298, the pin 313, fixed to the control lever 311, co-acts with the upwardly directed V-shaped recess 298a, but the pin 313, on its part is in no way connected with the angle lever 303.

On the front wall 154, of the calculating mechanism 126, is arranged a knob 315 (Figures 1, 2 and 22) which is capable of being set on "Add.," "Subtr." or "Disc." corresponding, respectively with addition, subtraction and disconnected and this knob is rigidly connected to the lever 316 at 315a (Figure 24). On the control member 316, pins 317, 318 (Figures 12 and 24) are arranged, which co-act with the control lever 246 in detail.

On the left-hand side of the calculating mechanism 126 (Figures 1, 2 and 25) is mounted the known cancelling key lever 319, which will not be further described at this point.

Further, on the shaft 300 (Figure 24) there is mounted a lever 320, which is rigidly connected to the lever 299, by means of a sleeve 321 (Figure 12). A pin 322, arranged on the lever 320, engages in a ring groove 164a (Figure 4) of a sleeve 164, rigidly mounted on the toothed wheel 162. The toothed wheel 162, if the cross totalizers Q1 and Q2 operate in the additive sense, is in engagement with the toothed wheel 324 (Figure 12) rigidly mounted on the shaft 323, which is rotatably mounted in the calculating mechanism 126. Further, on the shaft 323, there is arranged a toothed wheel 325, which is in fixed relation to the toothed wheel 324, by means of a sleeve 326. The toothed wheel 325, again, is in engagement with an intermediate wheel 328 rotatably mounted on the pin 327. The pin 327 is rigidly mounted on the right-hand side wall 125, of the calculating mechanism 126. As will be evident from Figure 11, the toothed wheel 162, can be moved sometimes into engagement with the toothed wheel 324 and at other times with the intermediate wheel 328.

Locking and unlocking, driving and coupling mechanisms for the cross totalizers Q1 and Q2

On the shaft 353 which, on the one hand, is rotatably mounted in the right-hand side wall 125 of the calculating mechanism and, on the other hand, in a bearing member (not illustrated) suitably mounted in the machine housing, a lever 354, (Figures 13 and 14) is rigidly mounted. A nose 361 (Figure 13) provided on the lever 354, is normally in engagement with the master wheel 362 (Figure 14) loosely rotatable on the shaft 323. With the master wheel, 362 and the sleeve 362a (Figure 14) a coupling half 363 (Figure 14) is rigidly connected.

Further, on the shaft 353, a lever 369 (Figures 13, 14) is rigidly mounted. A nose 371 (Figs. 13, 14) provided on the lever 354 is normally in engagement with the master wheel 372 loosely rotatable on the shaft 323.

With the master wheel 372, the sleeve 367g (Figure 14) is in fixed relation. To the sleeve 367g, a coupling half 375 (Figure 14), is fixed. As will be evident from the above, the sleeve 363a the master wheel 362, the sleeve 362a and the coupling half 363, are connected with one another and are loosely rotatable on the shaft 323, but are not axially displaceable thereon. The same holds for the parts 375, 367g and 372.

Further, on the shaft 323, a coupling sleeve, 378, consisting of the two coupling halves 376 and 377, is axially displaceable and rotates along with the shaft 323. With this arrangement, the coupling half 376 is capable of moving into engagement sometimes with the coupling part 363 and at other times the coupling half 377 is capable of moving into engagement with the coupling part 375, and finally in the middle position of the coupling sleeve 378, both of the coupling halves 376 and 377 simultaneously engage with the coupling parts 363 and 375, so that alternatively one or other of the totalizers Q1 or Q2 and finally both these totalizers can be operated at the same time.

Figure 14:
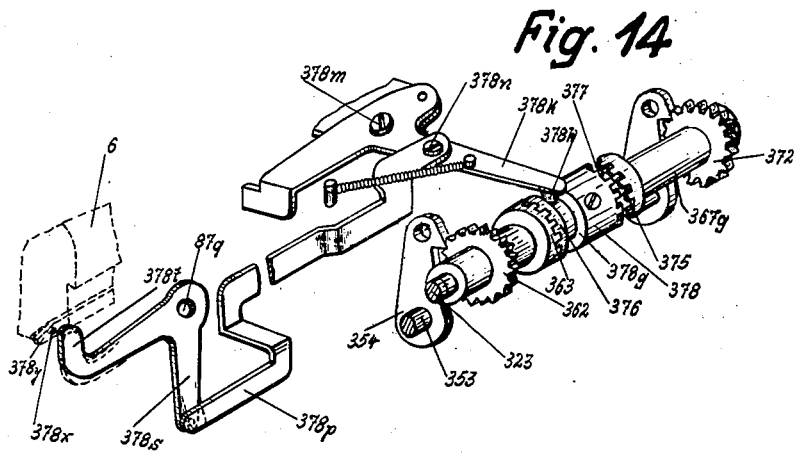
Figure 14 shows in perspective the control, known in itself, for the coupling arranged between both the driving wheels of the cross totalizers, viewed from the front left-hand side of the machine.
Figure 15:
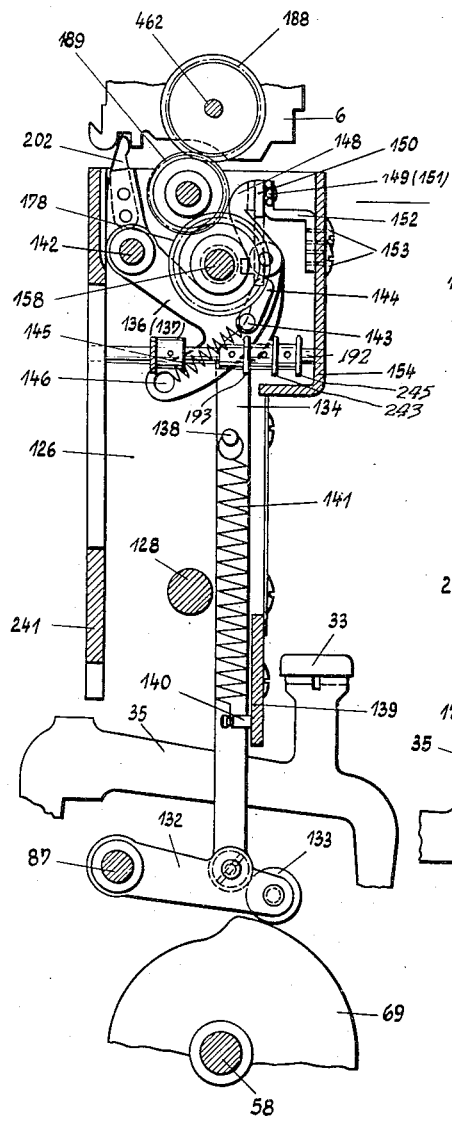
Figures 15 and 16 show in section detail parts in respect to Figure 10, Figure 15 showing the unlocking mechanisms and Figure 16 details of the value-transmitting mechanism.

In the ring groove 378g of the coupling sleeve 378, there engages a pin 378h (Figure 14) which is fixed to the lever 378k, correspondingly formed to that in Figure 14. The lever 378k is swingably mounted by means of a screw 378m, on a lug of the rear wall 241 (Figure 16) of the calculating mechanism. By means of a screw 378n, a connecting rod 378p is jointed to lever 378k which connecting rod 378p on its other end is in articulated connection with an angle lever 378s, swingably mounted in a suitable manner on the front wall of the calculating mechanism. The lever 378s is capable of co-acting by means of its right-angled upwardly bent nose 378t with a bar 378y attached to the column totalizer T, by means of screws 378x. (In Figure 14, only one is visible.)

Figure 13:
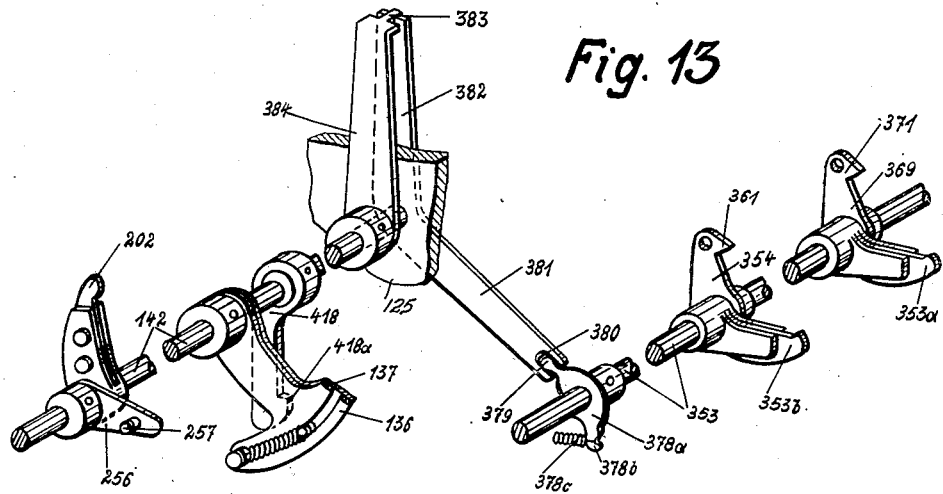
Figure 13 shows in perspective the unlocking mechanisms for the column and cross totalizers, viewed from the front left hand side of the machine.

On the shaft 353 (Figure 13) a lever 378a is rigidly mounted, which by means of its part 379, formed correspondingly to that in Figure 13, acts in a mouth 380 of a two-armed lever 381, swingably mounted on the shaft 142. With the nose 378b of the lever 378a, a spring 378c, engages, which acts on the shaft 353 in the clockwise direction and thus holds the parts 354 and 369 in engagement with the master wheels 362 and 372. The lever 381 is arranged on the outside of the right-hand side wall 125 (Fig. 13) of the calculating mechanism. This lever is constructed with its upper end of fork-shape. With this fork-shaped part 382 engages a nose 383 of a lever 384, rigidly mounted on the shaft 142 and having its upper end bent-off at right angles. The lever 384, moreover, is arranged at the left of the right-hand side wall 125 of the calculating mechanism.

Totalizer mechanisms

For the better understanding of said mechanisms it may be pointed out that in Figure 21, is illustrated a totalizer of the usual type used up to the present, while in Figure 22, is illustrated a totalizer modified in accordance with the invention.

On a shaft 456 (Figure 20) rigidly mounted in the two side walls 454 and 455 (Figures 20, 21 and 22), a lever 457 is swingably mounted in the lowest decimal place and is formed with its lower end of fork-shape. The release lever, 202 (Figure 10) hereinbefore described, is capable of engaging in the fork-shaped part 458, and of acting on the lever 457. With the lever 457 there engages a spring 459, which on the other hand is connected to a shaft 460 mounted in the two side walls 454 and 455 of the column totalizer T. The spring 459 acts on the lever in the clockwise direction round the shaft 456, whereby its normal position is determined by the tooth 461 of the lever 457 being in engagement with the 30 tooth toothed wheel 188 Ht rotatably mounted on the shaft 462.

With the toothed wheel 188 Ht (Figures 20, 21 and 22, 23) of the lowest decimal place, a disc 465 provided with three tens shift teeth 464 and a disc 466, are rigidly connected. The three parts 188 Ht, 465 and 466, are produced from a single piece and consequently represent a single element. The nose 467 provided on the upwardly directed free end of the lever 457 (Figure 16) is capable of acting on a flap 468 rockably mounted in the two side walls 454 and 455.

To the right of the lever 457 (as seen in Figure 20) there is a lever 469 swingably mounted on the shaft 456. The downwardly directed limb 470 of the lever 469, is of fork-shape, and is capable of coacting likewise with the release finger 202 above mentioned. The nose 471, of the lever 469, co-acts likewise with the flap 468. On the lever 469, a transfer wheel is rotatably mounted by means of a headed rivet 472 (Figures 20, 21 and 22), the transfer wheel consisting of a ten-tooth toothed wheel 473 a ten-toothed Maltese wheel 474 and a ten-tooth toothed wheel 475, produced from a single piece, of which the toothed wheel 475, is capable of co-acting with the three-toothed tens-shift disc 465 and the Maltese wheel 474, with the locking disc 466. The disc 466 is provided with three notches 476 for the free passage of the teeth of the Maltese wheel.

The toothed wheel 188 Ht is, further, in engagement with a toothed wheel 477 (Figures 14, 20, 21 and 22) which is loosely rotatable on a shaft 478, rigidly mounted in the two side walls 454 and 455 of the column totalizer T. The toothed wheel 477 again is in engagement with the toothed wheel 480, loosely rotatable on the shaft 479, which is rigidly mounted in the two side walls 454 and 455 of the column totalizer. A number roller 481 is rigidly connected with the toothed wheel 480. The toothed wheel, 475, associated with the lowest decimal place or the hundredths decimal place, is in engagement with the wheel 188 Zt of the tenths decimal place. The parts above described for the hundredths decimal place are similar for the tenths, units, tens etc. decimal places. In the following therefore only the differences will be pointed out.

By means of a lever 482 (Figures 17 and 20) swingably mounted on the shaft 456, of which lever the nose 483 (Figure 17) acts on a part 484, arranged on the flap 468, the flap 468 is held swung in the anti-clockwise direction (seen in Figure 20), whereby its rest position is determined by contact of the noses 467, 471 of the levers 457, 469 on the one hand, and, on the other hand, by contact of the nose 461 of the lever 457, in the tooth spaces of the toothed wheels 188. The lever 482, moreover, is held swung in the clockwise direction (seen in Figure 20) by means of a spring (not illustrated) which engages with the hole 485, of the lever 482.

Since in the pointing off-place of the column-totalizer which is in working position, no transfer into this column totalizer is permitted to take place, the locking shaft 142 (Fig. 9) and the parts located on it are prevented from being unlocked by the release finger 202, which when the pointing off-place of the column totalizer is opposite the master wheel 189 co-acts with the part S (Fig. 16) swingably mounted on the shaft 456 of the column totalizer T, in such a manner that the projection 487 of part S comes to lie against the shaft 488, fixed in the side walls 454, 455 of the totalizer T. Consequently from swinging outwardly the release finger 202 is prevented.

The differences which exist between the usual prior form of totalizer according to Figure 21 and the totalizers constructed according to the invention as illustrated in Figure 22, will now be referred to.

As is evident from Figure 20, the two wheels 188 Zt, 465, 466 and 188K, 465, 466 are connected by rivets 489 to one another, so as to form a single element, in order to bridge over the comma place, or for transferring a ten from the tenth's decimal place 188 Zt into the units decimal place 188E. It must first be set forth that if the wheels 475 of the transfer wheels 473, 474 and 475 are in engagement with their associated driving wheels 188 a rotation of the last named wheels is not possible as long as the wheel 474 is engaged by a concentric part of the locking disc 466 as shown in Fig. 20. Therefore, if e. g. the Maltese wheel 474, located between the hundredth's decimal place 188 Ht and the tenth's place 188 Zt contacts with its locking disc 466, the wheel 188 Zt will not be permitted to rotate, since the form of the teeth of the Maltese wheel 474, which contact with the locking disc 466 (Fig. 23) of the wheel 188 Ht, do not permit of rotation of the same. Accordingly, the wheel 475 which is rigidly connected to the Maltese wheel 474 and which is in engagement with the driving wheel 188 Zt, will not be permitted to rotate, since the form of the teeth of the Maltese wheel 474, which contact with the locking disc 466 (Fig. 23) of the wheel 188 Ht, do not permit of rotation of the same. Accordingly, the wheel 475 which is rigidly connected to the Maltese wheel 474, and which is in engagement with the driving wheel 188 Zt, will not permit of a direct rotation of the wheel 188 Zt by the master wheel 189 (Figure 10). If, on the other hand, after the locking lever 461, 457 (Figures 20 and 21) has been raised by the locking finger 202 (Figure 10) the driving wheel 188 Ht is acted on by the master wheel 189, so the wheel 188 Ht, as is readily perceived from Figure 23, may rotate without hindrance, as its locking disc 466 rotates past the teeth of the stationary Maltese wheel 474. If, now, during the rotational movement of the wheel 188 Ht a tens shift tooth 464 (Fig. 23) strikes against the toothed wheel 473 rigidly connected with the Maltese wheel 474, so the wheel 473, together with the Maltese wheel 474, can rotate through one unit, since at this instant the tooth concerned of the Maltese wheel 474, passes through the space 476 of the locking disc 466, of the wheel 188 Ht. Accordingly, as the parts 473, 474, 475 rotate through one unit, so the wheel 188 Zt will also rotate through one unit whereby the number roller of the tenth's decimal place is shifted by way of the wheels 477 and 480, through one unit.

If now, the wheel 188 Zt of the tenth's decimal place is to be rotated by the master wheel 189, the lever 469 (Figures 20 and 21) must be raised by the release finger 202. The transfer or locking wheel 473, 474, 475 located between the hundredth's decimal place and the tens place, moves out of engagement with its associated locking disc 466, and also with the wheel 188Zt, so that the latter can be rotated by the main driving wheel 189 (Figure 10). Moreover, the wheel 188K naturally, is also rotated by the rivets 489 without, however, having any action on the comma roller 490. If, however, a tens transfer results in the tenths decimal place, the units wheel 188E and the associated number roller are rotated, by way of the transfer wheel lying between the wheel 188K and the wheel 188E, one unit further.

The column totalizers as well as the cross totalizer, are modified according to Figure 22. Instead, therefore, as is shown in Figure 21, of riveting the wheel 188Zt to the wheel 188K, according to the invention, the wheel 188K, is riveted to the wheel 188E, as shown in Figure 22. Further the transfer wheel, which lies between the wheels 188K and 188E, as shown in Figure 21, is arranged according to Figure 22, between the wheels 188K and 188Zt, whereby the lever 469 holding the same must lie in the plane of the units decimal place and the transfer wheel is to be held through a distance sleeve 491 on its pin 472, by the lever 469.

The method of operation of the subject of the invention shall now be explained by the aid of an example of a calculation, whereby it is understood that according to the invention no totals should be taken from the calculated any registered values.

*General working processes, prior to the bookkeeping of the first value*

After the form is inserted, to commence with the name "O. Schmidt" (Figure 27) is typed in the column indicated by "1" by striking the letter keys 32 (Figures 1, 2 and 3) whereby the paper carriage 4 is traversed stepwise to the left and the column of the sheet indicated by "2" has moved into the typing position. In the column "2," the number "15" is now entered by striking the corresponding number typing keys 33 (Figures 1, 2 and 3).

After the number "15" has been typed and by utilizing the space key S (Figures 1, 2 and 3) the paper carriage 4 has been brought into a position in which the column indicated by "3" is in the typing position. By means of the letter keys 32, the "months" column "3" is now filled in, whereby the paper carriage 4 is brought so that the column of the sheet indicated by "4" is in the typing position.

In order to facilitate the survey of the eight totalizers T1 to T8, necessary for filling up the sheet illustrated in Figure 27 and the type of shift of the cross totalizers Q1 and Q2 (Figures 1 and 3) which the known control plates 301 (Figures 1, 12 and 24) of the column totalizers T1 to T8 are set for the kind of calculation of the cross totalizers Q1 and Q2, a table is illustrated in Figure 28.

As already stated, the paper carriage 4 is located so that the column "4" of the sheet is in the typing field, whereby the totalizer T1 is also in the working position. Moreover, the carriage s2 carrying both of the cross totalizers Q1 and Q2 has been taken so far to the left, the column totalizer T1 and the coupling device s, s1 (Figure 1) that the corresponding decimal places of the totalizers lie opposite to the master wheels 362 (Figure 12) and 372. On the column totalizer T1 moving into the working position, however, the bar 81t (Figure 11) fixed to the same, has come into operation on the nose 81s' of the lever 81s, whereby the nose 81s'' of the lever 81s has released the lever 81u. Now the calculating keys 34, corresponding to the amount of "RM 200" are depressed after one another, the key corresponding to the value "2" being struck first. It may be first remarked that in consequence of the positioning for addition of the change-over gear illustrated in Figure 12, by the setting plate 301, of the totalizer T1 this amount is added in the cross totalizer Q1. Since, however, the sleeve 378 (Fig. 14) which in this case is not displaced by the cam 378y of the totalizer T1 from its position shown in Fig. 14 the coupling halves 375, 378 are out of engagement according to which the amount is not registered in the totalizer Q2. The direction of rotation of both master wheels 362, 372 (Fig. 14) is determined by the cams 301 of the column totalizer T1.

*Operation of the calculating mechanism including the unlocking processes*

On the depression of the calculating key lever corresponding to the value "2," the rearwardly directed limb on the calculating key lever 82 (Figures 6 and 10) is swung round the shaft 68 in the clockwise direction, whereby the associated U-shaped stop member 85, the downwardly directed limb 84 of which contacts on a face 82a of the calculating key lever 82, is swung in the anti-clockwise direction round its shaft 87. The contact pin 131, provided on the stop piece 85, thereby moves into the path of movement of the arm 130 of the feeler finger 129, corresponding to the value "2." Further, on the further depression of the already mentioned calculating key 34, the pawl 95 (Figures 3, 6, 8 and 10) arranged on the key lever 82, acts on the right-angled upwardly bent nose 97 of the bar 98, mounted on the pins 98a (Figures 6 and 7) and swings this in the clockwise direction against the action of the spring 109. Moreover, the edge 98s of the lug 98x (Figure 6) of the bar 98, slides from the edge 103g of the bearing member 103, which is formed as a stop 103a, whereby the levers 100, 101 and 111 rigidly mounted on the shaft 99, and further the three-armed lever 114, mounted on the shaft 68, and in engagement with the lever 114, by means of the pin-slot connection 112, 113, can follow the pull of the spring 115.

On the swinging of the parts 100, 98 and 101 in the anti-clockwise direction the nose 97 of the bar 98 slides underneath the nose 95d of the pawl 95. The locking bar 110 swingably arranged on the shaft 99, which at its ends, on account of the pull of the spring 110b, lies against pins 100b and 101b respectively, likewise participates in the movement through the release of the bar 98 by the stop 103a, and is swung in the anti-clockwise direction. By the movement of the locking bar 110, the upwardly-directed right-angled bent bridge 110g, slides over a nose 82h (Figures 6 and 8) of the depressed key lever 82, and locks the same in the depressed position. Further, a part 120c, fixed to the locking bar 110, participates in the swinging movement and slides along on the under edge of a two-armed lever 120 (Figures 3, 6 and 8) swingably mounted on the shaft 68 and, in consequence of the pull of the spring 123, attached to the lever 120, is held in the recess 120d until after a revolution of the coupling consisting of the cams 69, 71, 72, the lever 120, the part 120c, as well as the locking bar 110, are released again in a manner to be later described. A depressed calculating key lever 82, therefore, is not released again, owing to the locking means, 120c and 120d, until the corresponding value has been transferred. Further simultaneous depression of two calculating keys 34, cannot take place owing to the roller lock illustrated in Figure 9. As already explained, on striking the calculating key 34, corresponding to the value "2," the system of levers 100, 101 and 111, attached to the shaft 99, as well as the three-armed lever 114, swingably mounted on the shaft 68, have been released, whereby the latter lever under the pull of its spring 115, has been swung in the direction of the arrow "m" (Figures 6, 3 and 8). The nose 114x of the upwardly directed arm 114a, of the lever 114, moves out of reach of the nose 80, of the pawl 74. The downwardly-directed arm 114b, on the other hand, has moved into the path of movement of the cam 72. Since the pawl 74 is displaceable in relation to the cam 72, by means of the pin-slot connection 75, 76, 77, 78 and the compression spring 79, and was locked by the nose 114x of the lever 114, the pawl 74 will follow in the arrow direction "c" under the pressure of the spring 79, on swinging out of the lever nose 114x, whereby the tooth 74a of the pawl 74, moves into engagement with the toothed wheel 73 continually rotated by way of the parts 58 (Figure 1), 59, 56, 57 and 28 to 30, whereby all three cams 69, 71 and 72 are coupled with the toothed wheel 73 so that they participate in the rotational movement of the toothed wheel and in the arrow direction "b" (Figures 3, 6 and 8).

In the rotation of the three cams, after the nose 80 of the pawl 74, has just moved past the nose 114a of the three-armed lever 114, the cam 72 first acts at 60 degrees (Fig. 29) on the arm 114b of the three-armed lever 114 lying in the path of movement, and brings the upper arm 114a of the lever 114, in the anti-clockwise direction into the path of movement of the nose 80 of the pawl 74, and acts on the pawl 74 in the raising sense in a manner to be later described. By the return of the lever 114, the tension spring 115, is again tensioned and the bar 98, mounted on the levers 100 and 101 is returned by the arm 111 connected to the lever 114, and by the resulting swinging movement of the shaft 99, in the clockwise direction, whereby the nose 98x of the bar 98, moves behind the bend 103a of the stationary support 103 by means of the pull of the spring, 109. In consequence of the rocking movement of the bar 98 in the clockwise direction, the nose 95d of the pawl 95 falls behind the nose 97 of the bar 98 since at this moment the key lever follows the movement of the flap 98, and rests behind the nose 97 of the bar 98, since at this moment the key lever 82 concerned, is still depressed and is held by the locking bar 110 which is held by the part 120e through the lever nose 120d. Although the locking bar 110 is held swung in its position in the anti-clockwise direction, the part 100, 98 and 101, in consequence of the resilient connection of the spring 110b, are still capable of swinging in the clockwise direction.

On the further rotation of the three cams 69, 71, 72, the roller 133 on lever 132 (Figs. 3, 6 and 9) which by means of the pull of the spring 141, is held in contact with the cam 69 (Figure 6) first follows at 10 degrees (Fig. 29) the depression of the same, whereby the draw-bar 134, jointed to the roller lever 132, following its spring 141, is drawn in the direction of the arrow "a." The part 137, pivotally connected with the draw-bar 134 (Figure 10) by means of the screw 135, is thereby moved downwards along with the draw-bar 134. The pin 143, fixed to the part 137, which passes through the slot 144 of the lever 136, takes the latter and the shaft 142 along with it in the clockwise direction. The angle lever 150, which on the one hand is jointed to the lever 136 through an angle member 148, is likewise, through the movement of the draw-bar, swung round its point 151 in the anti-clockwise direction. Consequently the downwardly going arm of the lever 150 displaces the toothed wheel 159, non-rotatably mounted on the shaft 158 in the arrow direction "a2," by means of its grooved connection 155 and 156, whereby the teeth of the same are coupled with the teeth 177 of the calculating sector 174. The pins 160 (Figure 4) arranged on the toothed wheel 159, which are continually guided in the grooves of the claw 161, rigidly mounted on the shaft 158, ensure that the teeth of the toothed wheel 159, slide securely into the teeth of the calculating sector 177 (Figure 10). As already mentioned, the shaft 142 is rotated in the clockwise direction by the lever 136, whereby the finger-shaped lever 202 rigidly mounted on the shaft 142, is swung and the locking lever 457, partially illustrated in Figure 10 (see also Figure 20) unlocks the corresponding decimal place of the totalizer T1 located in the working position.

Further, on the one hand, the adjusting tooth 203, which is rigidly mounted on the shaft 142, releases the master wheel 189, and the shaft 186 connected with it, and, on the other hand, the adjusting tooth 179 likewise rigidly mounted on the shaft 142, releases the toothed wheel 178 and the shaft 158 connected with it.

The locking lever 199, pinned to the shaft 142, swings in the clockwise direction and releases the nose 197 of the lever 196 jointed to the lever 194, by means of a screw 195.

By the swinging movement of the shaft 142 (Figure 13) in the clockwise direction, the levers 384 and 381 are also swung in the clockwise direction, whereby the part 378a is swung together with the shaft 353 and the two locking teeth 354 and 369, in the anti-clockwise direction. Accordingly, these two locking teeth also release the master wheels 362 and 372 of the cross totalizers Q1 and Q2. Moreover, the release fingers 353a and 353b, attached to the shaft 353, are also swung with this shaft in the anti-clockwise direction, whereby the locking lever of the corresponding decimal places of the cross totalizers Q1 and Q2 are released. Since, as stated, the locking levers 354 and 369 mounted on the shaft 353, are also swung in the anti-clockwise direction, the driving wheels of the cross totalizers Q1 and Q2 are released for possible tens transfer occurring.

After these movements have taken place, the cam 72, meanwhile, on further rotation has moved so that its lower curved part has arrived in the vicinity of the roller 168 on lever 167 whereby the lever 167 at 30 degrees (Fig. 35) following the pull (Figures 6 and 9) of the spring 171 engaging with the slide 170 and the correspondingly formed cam 72, is swung round its shaft 87 and accordingly the slide 170 jointed by means of the screw 169 (Figure 6) is drawn in the direction of the arrow "a." By the downward movement of the slide 170, the slot 173x (Figure 10) acts on the roller 175 (Figures 4, 10 and 16) arranged on the calculating sector 174, 177 and projecting through the slot 173x, and swings the sector 174, 177 in the direction of the arrow "p." Since the latter is rigidly connected to the shaft 128, by means of the clamping device 176, this shaft participates in the rotational movement in the direction of the arrow "p." The feeler fingers 129, rigidly mounted on the shaft 128 and designed for the values "0" to "9" are thereby swung together in the anti-clockwise direction and so far until the feeler finger 129 corresponding to the value "2" strikes on the pin 131 of the stop-piece 85, which has been swung upwards by depression of the calculating key 34, corresponding to the value "2." The stroke of the feeler finger 129, is thereby transmitted to the calculating sector 174, 177 and accordingly the toothed wheel 159 (Figures 10 and 16) which is in engagement with the sector, is rotated through two units, whereby the value is transmitted by way of the shaft 158, and the change-over gear 180 (Figure 9) 187, which was previously set for addition, through the knob 315 (Figure 1) and the shaft 186, to the main driving wheel 189, which on its part, registers the value "2" in the corresponding totalizer decimal place of the column totalizer T1.

Moreover, the rotational movement of the shaft 158 (Figure 10) is transmitted by way of the change-over gear illustrated in Figure 12, to the shaft 323 on which the sleeve 378 (Figure 14) is fixed, which, as hereinbefore described, is coupled only with the main driving wheel 362, for the cross totalizer Q1, whereby the value "2" is registered only in this cross totalizer.

By the contact of the feeler finger 129, corresponding to the value "2" with the stop member 131, the slide 170, together with the roller 168 on lever 167, was prevented from further downward movement and since the formation of the cam 72 (Figure 6) is adapted for the greatest stroke, namely for the stroke of the feeler finger 129, corresponding to the value "9," so the roller 168 on lever 167, remains for a short time freely suspended, and on the further rotation of the cam 72, is engaged and brought back.

*Operation of the automatic printing mechanisms*

Before, however, the return of the roller 168 on the lever 167 and the slide 170 connected with it occurs the arms 204 and 211 (Figures 4 and 10) rigidly mounted on the ends of the shaft 128, participate in the swinging movement of the feeler fingers 129 (or of the calculating sector 174, 177) and of the shaft 128. Accordingly the frame, 213, 216 and 206, jointed at the points 212 and 205 and guided on the slide bars 219, 222 by means of screws 220 and 217, will slide forwards through an amount corresponding to the value "2." The lower edge 216a of the front bridge 216, thereby reaches a position over the nose 35g (Figure 16) of the number key lever 35, corresponding to the value "2."

Shortly, thereafter, the roller 166 which is mounted on lever 165, rigidly connected with the shaft 87 (Figures 6 and 10) falls into the depression of the cam 71 at 120 degrees (Fig. 29) whereby the arms 219 and 222, rigidly connected to the shaft 87, are swung in the clockwise direction by the springs 225 engaging with their short arms 223 and 224 and with them also the frame 213, 216, 206 guided by them. This frame thereby strikes on the nose 35g (Figure 16) of the number typing key lever 35, corresponding to the value "2" and presses this lever downwards against the action of its spring 38 (Figure 3). The control tooth 49c of the draw-hook 49, is moved by the coupling lever 41, into engagement with the cam shaft C. This now draws the draw-hook 49 forwards, which by way of the intermediate lever 47, causes the type lever 54 to strike on the platen 5, whereby during the striking movement the control tooth 49c moves out of engagement with the cam shaft C. Through the striking movement of the type lever, the paper carriage 4 has been moved by way of the parts 54a to 54e one step to the left under the pull of the carriage draw-spring so that the next lower place of the column totalizer T1 now lies opposite to the main driving wheel 189 (Figure 10).

*Return movement of the calculating and printing mechanisms*

After the termination of the calculating operation and before the commencement of the paper carriage shift (in which the time for registration of the value "10" is to be taken into consideration) the raising of the roller 133 on lever 132, which is loosely mounted upon the shaft 87, is effected at 145 degrees (Fig. 29) by the elevated part of the cam 69, which is indicated by 69c. The slide 134 (Figure 10) is thereby raised in the opposite direction of the arrow a. It thereby takes along with it the lever 137, by means of the screw 135, in the anti-clockwise direction whereby by way of the parts 143, 145 and 146, the lever 136 is swung in the anti-clockwise direction. In consequence of this swinging movement of the lever 136, on the one hand, the shaft 142 is swung in the anticlockwise direction, and, on the other hand the wheel 159, is brought out of engagement again (Figure 4) with the calculating segment 174, by means of the parts 148 and 150 (Figures 10 and 4). By the swinging movement of the shaft 142 in the anti-clockwise direction, the releasing finger 202 (Figure 10) has released the locking lever (in Figure 9 illustrated broken off), lying opposite to it, so that the calculating place of the totalizer T1, in which the value "2" was registered is again locked. By the swinging movement of the shaft 142, in the anti-clockwise direction, the lever 199 (Figure 10) has also been swung along with it and has swung the lever 196 against the action of its spring 200.

Further, by the swinging movement of the shaft 142, in the anti-clockwise direction (Figure 13) the release fingers 353b, 353a of the two cross totalizers Q1 and Q2, are swung, by way of the parts 384, 383, 382, 381, 378a and 353 in the clockwise direction, whereby the corresponding locking levers were also released and consequently the associated calculating places were locked. Further, the teeth 179 and 203, fixed on the shaft, 142 (Figure 10) and also the teeth 354 and 369, fixed on the shaft 353 (Figure 13) have entered again into their wheels 178 and 189 and also 362 and 372, whereby the calculating mechanism also is again locked. As soon as these locking operations are completed, the carriage shift operation effected by the typing operation as above described follows.

After the locking operation is effected, the roller 166 on the lever 165 which is rigidly mounted on the shaft 87, is raised at 225 degrees (Fig. 29) by the rising edge 71a (Figure 6) of the cam 71. The shaft 87 is thereby swung in the anti-clockwise direction. Accordingly, the arms 222 and 219, fixed on the shaft 87, are also swung in the anti-clockwise direction, whereby the frame 213, 216, 206 mounted in them, is raised into its upper position. In consequence of this, the nose 35g (Figure 16) of the number key lever 35, corresponding to the value "2" is released. This now returns into its rest position under the action of its spring 38 (Figure 3), whereby the coupling lever 41 mounted on the key lever again engages over the nose 45 of its co-operating draw lever 49.

In the swinging movement of the shaft 87 (Figure 10) in the anti-clockwise direction, the arm 194 has also raised the lever 196, whereby under the action of the spring 200, the nose 197 of this lever snaps over the nose 198 of the lever 199 already located in its rest position.

After the raising of the frame 213, 216, 206, the rising face 72b (Figure 6) has come at 240 degrees (Fig. 29) into operation on the roller 168 mounted on lever 167 which is loosely mounted on the shaft 87, and has brought this lever into its rest position. The slide 170 was thereby raised against the action of its spring 171, whereby the inclined slot 173x of the slide, acts on the roller 175 of the calculating sector 174, which has meanwhile been released from the wheel 159, and swings this sector in the opposite direction to the arrow p. In consequence of this, on the one hand, the shaft 128 rigidly connected to it, is brought back together with the feeler fingers 129 into their rest position, while on the other hand, the number key striking frame 213, 216, 206 is returned to its rest position illustrated in Figure 9, by way of the arms 204 and 211 jointed to it and rigidly mounted on the shaft 128, in which position the frame is held by the elevated part of the cam 72 (Figure 6).

Further, before the return movement of the number key striking frame 213, 216, 206, into its rest position illustrated in Figure 9 has taken place the rising edge 69c (Figure 6) of the cam 69, has come into operation at 162 degrees (Fig. 29) on the end 120a of the lever 120, whereby this lever is swung against the action of its spring 123. Consequently the nose 120b, of the lever 120, releases the part 120c of the locking bar 110, whereby this bar under the action of its spring 110b (Figure 7) tensioned by the previous return of the bar 98 into its rest position, likewise moves back into its rest position. Accordingly, the nose 82h (Figure 6) of the calculating key lever 82 corresponding to the value "2" is released, which lever under the action of the spring 89 engaging with its associated stop member 85 (Figure 10) now returns along with the stop member 85 into the rest position illustrated in Figure 9, whereby the pawl, mounted on the calculating key lever 82, also rests again over the edge 97 of the bar 98.

Finally, the nose 80 of the pawl 74, mounted on the coupling disc 72 (Figure 6) pushes against the nose 114x of the three-armed lever 114, already located in its rest position, whereby the pawl 74 is brought out of engagement against the action of its spring 79, with the wheel 73 of the continually rotating shaft 58. In order to prevent the cam series 69, 71, 72 from springing back at the moment when the pawl 74 is raised out of engagement with the toothed wheel 73, the roller 117 of the roller lever 116, snaps at 200 degrees (Fig. 29) into the depression 69d of the cam 69 under the action of its strong spring 119, whereby the cam series 69, 71, 72 on the pawl 74 being raised is held in their position illustrated in Figure 6.

It would be too exhaustive a matter to repeat the process already described for the registration of the value "2" for the values to be registered in the totalizers T2 to T6 since the operation are exactly the same.

*Operation of the printing mechanisms for printing the value "0"*

The paper carriage of the totalizer T1 is now located with the decimal place following the value "2" in the column 4 (Figure 27) in the working position, in which a "0" is to be registered, i. e. in this case, therefore, no calculating operation is to take place, while the typing process must be released.

To this end, the feeler finger 129, corresponding to the zero calculating key 82 (Figure 10) is fixed to the clamping jaw part 129d, of the arm 204. On striking the zero calculating key 34, the same operations occur exactly as above described, only with the difference, that in consequence of the contact of the finger 129 corresponding to the value "0", with its stop screw 131, no swinging of the calculating segment results. On the other hand, the bar 216 is moved downwards and strikes on the nose 35g of the number typing key corresponding to the value "0" are the associated type lever is caused to strike. Herewith, a carriage step is again released so that now the units decimal place of the totalizer T1 (the place lying next the comma place) is located in the working position.

Here, the same operations take place since a "0" is to be dealt with, whereby the totalizer T1 moves so that its comma place is in the working position.

*Operation of locking mechanisms for preventing calculating and printing processes in the comma place*

If, here, unintentionally a calculating key is struck, so the coupling 69, 71, 72, 74 naturally makes a revolution and the bar 216 would be moved downwards by the cam 71 and the roller lever 165, 166, by way of the parts 87, 222, 219 and the number typing key corresponding to the value of the depressed key would be depressed, whereby the value printed would obviously be incorrect. In order to prevent this, the locking arrangement 197, 196, 194 is provided which does not permit swinging of the shaft 87, and with it a downward movement of the bar 216.

This locking action is obtained by arranging a fixed locking member S (Figure 20) in the comma position. Accordingly, since this cannot swing out, so the release finger 202 (Figure 10), lying opposite to it cannot swing in the clockwise direction. On account of this the shaft 162 and the lever 199 remain substantially in their rest position and thus do not release the lever 196, since owing to this, the lever 136 cannot swing out, so that the parts 148 and 150 connected to it remain at rest, so that the wheel 159 does not move into engagement with the calculating segment 174. This segment can thus swing out under the action of the spring 171, which engages with its operating part, 170, whereby only an idle stroke of the same and of the bar 216, is caused. This however, in consequence of the abovementioned effective position of the locking device 199, 196 will not cause a numeral type actuation.

*Operation for printing a comma in the comma place*

Nevertheless, if it is desired, a comma could be printed under these circumstances in the comma place. For this, it is only necessary that the slots 218 (Figure 10) and 221 in the arms 219 and 222 are formed of such length that the calculating segment 174 can swing through ten units so that in this case, therefore, the bar 216 could act on a projection 35g' (Figure 16) of the comma typing key. At the same time, however, the locking device 199 (Figure 10) above described must be abandoned, since this device would prevent a swinging movement of the shaft 87, and therewith a downward movement of the bar 216. In spite of the swinging movement of the segment 174, however, no transmission of values takes place to the calculating mechanism, since, as mentioned, the wheel 159, is not in engagement with the calculating segment 174. In the present case, the typing of the comma is discarded and thence the lock 196, 199 is retained.

*Several operations for the further working processes and for preparing the transfer of the values "184.30" and "4.30" from the cross totalizers Q1 and Q2 to the column totalizers T7 and T8*

In order to pass from the comma place into the next lower decimal place, the space key L (Figures 1 to 3) is struck, so that the totalizer T1 is now located with its tenths decimal place in the working position.

If the numerical example given in Figure 27 is now considered, so it should be clear without further explanation that for the further columns, including the column 9, the same procedure is followed only with the difference that in the columns 5 to 7, inclusive, the cross totalizer Q1 is changed over to subtraction by the corresponding column totalizers T2 to T4, while the sleeve 378 (Figure 14) remains in its left-hand position in which the cross totalizer Q2 is therefore uncoupled.

In the columns 8 and 9 (Figure 27), the sleeve 378, is brought into its middle position by the totalizers T5 and T6 and positioned for addition so that the values shown in the columns 8 and 9, are added in both of the cross totalizers Q1 and Q2.

The amount "184.30" is then visible in the cross totalizer Q1 and the amount "4.30" in the cross totalizer Q2.

In order to withdraw these amounts from the cross totalizers Q1 and Q2 and register them automatically in the column totalizers T7 and T8, it is necessary first to depress the tabulator key T100 (Figure 2) in order to bring the hundreds decimal place of the column totalizer T7 into the working position, whereby the cross totalizers Q1 and Q2 are also moved by means of the coupling device s, s1 and s2 (Figure 1), so that their hundreds decimal places also are brought into the working position.

As soon as the column totalizer T7 arrives in the working position, the pre-setting plate 301 (Figure 24), which has been set on subtraction, of the column totalizer T7, acts on the nose 302 of the angle lever 303 and swings the same round the shaft 304 in the clockwise direction, against the action of the spring 307.

In this movement, the fork-shaped part of the lever 303, acts on the pin 309 riveted to the part 311, whereby the same is swung in the clockwise direction. Since the pin 309 is in engagement with the recess 312 of the part 298 the control rod 298 is displaced in the direction of the arrow r, indicated in Figure 12. In consequence of this, the lever 299, the shaft 300, the lever 320 and the lever 347 are swung in the anti-clockwise direction. Since the pin 322 of the lever 320 and the pin (not illustrated) of the lever 347 engage in the ring groove of the sleeve 326 rigidly mounted on the toothed wheel 162, the toothed wheel 162 is displaced to the left on the shaft 158 and in this manner is disengaged from the toothed wheel 324 and is engaged with the intermediate wheel 328 which, again is in engagement with the toothed wheel 325, which is not rotatable on the shaft 323. In this manner the direction of rotation of the driving wheel 362 has been reversed. In regard to this it may be remarked that the bar 378y (Figure 14) is so arranged on the column totalizer T7 that the bar 378y on the entrance of the column totalizer T7 into the working position is not able to rock the levers 378t, 378s according to which the sleeve 378 remains in its position, illustrated in Figure 14, in which the teeth 377 of the sleeve 378 are out of engagement with the teeth 375 of the driving wheel 367g, 372 of the cross totalizer Q2, while the teeth 376 of the sleeve 378 are in engagement with the teeth 363 of the driving wheel 362 for the cross totalizer Q1. Consequently, on the operation of the machine the number rollers of the cross totalizer Q1, are rotated in the negative sense, while the number rollers of the cross totalizer Q2, are not acted upon. The column totalizer T7 remains set for additive operation.

Now the transfer operation above mentioned is effected by total taking from said cross totalizers Q1 and Q2. These operations are not an object of this invention and therefore not described.

Although the invention is described by way of example as applied to a Mercedes Addelektra typewriting-calculating machine, it may be applied, with more or less alterations, to any other typewriting-calculating machine, without departing from the real spirit of the invention.

I claim:

1. In a combined typewriter and calculating machine, the combination of value typing keys, and a register including value wheels, calculating keys corresponding in value to said typing keys, a differential mechanism operative under control of said calculating keys and including a variably rockable toothed sector, means to operatively connect said sector with said wheels, a driving member common to and operable under the control of the several calculating keys for driving said sector, and means controlled by said sector for selectively operating said typing keys in correspondence with said calculating keys.

2. In a combined typewriter and calculating machine, the combination of value typing keys, and a register including value wheels, calculating keys corresponding in value to said typing keys, a differential mechanism operative under control of said calculating keys and including a variably rockable toothed sector, means to operatively connect said sector with said wheels, a driving member common to and operable under the control of the several calculating keys for driving said sector, means for selectively operating said typing keys in correspondence with said calculating keys, said key operating means including a member common to all of the typing keys and adjustable by said sector.

3. In a combined typewriter and calculating machine, the combination of value typing keys, and a register including value wheels, calculating keys corresponding in value to said typing keys, a differential mechanism operative under control of said calculating keys and including a variably rockable toothed sector, means to operatively connect said sector with said wheels, a driving member common to and operable under the control of the several calculating keys for driving the sector, means for operating said typing keys, said key operating means including a rocking bail common to all of the typing keys and adjustable under control of said sector to operate the typing keys in correspondence with said calculating keys.

4. In a combined typewriter and calculating machine, the combination of value typing keys, and a register including value wheels, calculating keys corresponding in value to said typing keys, a differential mechanism operative under control of said calculating keys and including a variably rockable toothed sector, means to operatively connect said sector with said wheels, a driving member common to and operable under the control of the several calculating keys for driving the sector, means for operating said typing keys, said key operating means including a rocking bail adjustably extensible under control of said sector for selectively operating the typing keys in correspondence with the calculating keys.

5. In a combined typewriter and calculating machine, the combination of value typing keys, and a register including value wheels, calculating keys corresponding in value to said typing keys, a differential mechanism operative under control of said calculating keys and including a variably rockable toothed sector, means to operatively connect said sector with said wheels, a driving member common to and operable under the control of the several calculating keys for driving said sector, means for operating said typing keys, said key operating means including a rocking bail adjustably extensible under control of said sector for selectively operating the typing keys in correspondence with the calculating keys, and a cam for operating said bail under control of said calculating keys.

6. In a combined typewriter and calculating machine, the combination of value typing keys, and a register including value wheels, calculating keys corresponding in value to said typing keys, a differential mechanism operative under control of said calculating keys and including a variably rockable toothed sector, and swinging stops settable by said calculating keys for limiting the movement of the sector, means to operatively connect said sector with said wheels, a driving member common to and operable under the control of the several calculating keys for driving said sector, and means controlled by said sector for selectively operating said typing keys in correspondence with said calculating keys, said key operating means including a rocking bail adjustably extensible under control of said sector for selectively operating said typing keys.

7. In a combined typewriter and calculating machine, the combination of value typing keys, and a register including value wheels, calculating keys corresponding in value to said typing keys, a differential mechanism operative under control of said calculating keys and including a variably rockable toothed sector, a rock shaft supporting said sector, fingers on said shaft, and swinging stops settable by said calculating keys for limiting the movement of said sector, means to operatively connect said sector with said wheels, a driving member common to and operable under the control of the several calculating keys for driving said sector, and means controlled by said sector for selectively operating said typing keys in correspondence with said calculating keys, said key operating means including a rocking bail adjustable under control of said sector.

8. In a combined typewriter and calculating machine, the combination of value typing keys, and a register including value wheels, calculating keys corresponding in value to said typing keys, a differential mechanism operative under control of said calculating keys and including a variably rockable toothed sector, means to operatively connect said sector with said wheels, a driving member common to and operable under the control of the several calculating keys for driving said sector, and means controlled by said sector for selectively operating said typing keys in correspondence with said calculating keys, said key operating means including a rock shaft, levers fixed to and rockable with said shaft, a bail slidable on said levers under control of said sector for relatively operating said typing keys, and means for rocking said shaft, levers and bail.

9. In a combined typewriter and calculating machine, the combination of value typing keys, and a register including value wheels, calculating keys corresponding in value to said typing keys, a differential mechanism operative under control of said calculating keys and including a variably rockable toothed sector, means to operatively connect said sector with said wheels, a driving member common to and operable under the control of the several calculating keys for driving said sector, and means controlled by said sector for selectively operating said typing keys in correspondence with said calculating keys, said key operating means including a rock shaft and a typing key operating bail carried by said rock shaft and adjustable under control of said sector, a one revolution clutch controlled by said calculating keys, and cams actuated by said clutch for actuating said driving member and rock shaft.

10. In a combined typewriter and calculating machine, the combination of value typing keys including key levers, a register including value wheels, calculating keys corresponding in value to said typing keys, differential stop members controlled by said calculating keys, a driving member common to and operable under the control of the several calculating keys, a rockable toothed sector, a pin and slot connection between said driving member and said sector for rocking the latter, members connected with said rocking sector and coacting with said stop members for variably limiting the rocking movement of said sector under the influence of said driving member, extensions on said key levers of graduated length, and a member rockable in degree proportional to the rocking movement of said sector and engageable with said extensions for operating said typing keys in correspondence with the calculating keys.

HUGO ERNST KÄMMEL.